US008083587B2

(12) United States Patent
Okada

(10) Patent No.: US 8,083,587 B2
(45) Date of Patent: Dec. 27, 2011

(54) GAMING MACHINE WITH DIALOG OUTPUTTING METHOD TO VICTORY OR DEFEAT OF GAME AND CONTROL METHOD THEREOF

(75) Inventor: Kazuo Okada, Tokyo (JP)

(73) Assignee: Aruze Gaming America, Inc., Las Vegas, NV (US)

( * ) Notice: Subject to any disclaimer, the term of this patent is extended or adjusted under 35 U.S.C. 154(b) by 522 days.

(21) Appl. No.: 12/356,851

(22) Filed: Jan. 21, 2009

(65) Prior Publication Data

US 2009/0203427 A1      Aug. 13, 2009

Related U.S. Application Data

(60) Provisional application No. 61/027,236, filed on Feb. 8, 2008.

(51) Int. Cl.
*A63F 9/24* (2006.01)
(52) U.S. Cl. ............... 463/30; 463/20; 463/31; 463/43; 463/45; 704/251; 704/E15.005
(58) Field of Classification Search .................... 463/20, 463/30, 31, 43, 45; 704/251, E15.005
See application file for complete search history.

(56) References Cited

U.S. PATENT DOCUMENTS

| | | | |
|---|---|---|---|
| 6,093,105 A * | 7/2000 | Morihira | 463/38 |
| 6,604,999 B2 | 8/2003 | Ainsworth | |
| 7,470,192 B2 * | 12/2008 | Yamamoto et al. | 463/30 |
| 2002/0065124 A1 | 5/2002 | Ainsworth | |
| 2004/0053676 A1 | 3/2004 | Rodgers | |
| 2007/0094004 A1 | 4/2007 | Huang et al. | |
| 2007/0094005 A1 | 4/2007 | Huang et al. | |
| 2007/0094007 A1 | 4/2007 | Huang et al. | |
| 2007/0094008 A1 | 4/2007 | Huang et al. | |

FOREIGN PATENT DOCUMENTS

JP      2004-135901 A      5/2004
JP      2007-007172 A      1/2007

* cited by examiner

*Primary Examiner* — Jack Chiang
*Assistant Examiner* — Wilner Jean Baptiste
(74) *Attorney, Agent, or Firm* — NDQ&M Watchstone LLP

(57) ABSTRACT

A slot machine 1 of the present invention makes a control so as to: sequentially store the number of game values consumed per unit game; sequentially store the number of game values given per unit game; calculating a difference between the total number of game values given and the total number of game values consumed, as a self game value difference; transmitting the self game value difference to outside; receiving someone's game value difference from outside; when the self game value difference and the someone's game value difference are in a predetermined relationship, voice-outputting, by the conversation controller 91, an answer at volume corresponding to the predetermined relationship from the speaker 23 in response to a voice input through the microphone 90; and delete the stored numbers of game values given and consumed, under a predetermined condition.

9 Claims, 22 Drawing Sheets

FIG. 8

BASE GAME WINNING COMBINATION LOTTERY TABLE

| WINNING COMBINATION | RANDOM NUMBER |
|---|---|
| BONUS GAME IS TRIGGERED THREE OR MORE SYMBOLS OF "SUN" ARE DISPLAYED | 0~49 |
| ♥ × 5 | 50~51 |
| ☾ × 5 | 52~57 |
| K × 5 | 58~97 |
| A × 5 | 98~177 |
| Q × 5 | 178~277 |
| J × 5 | 278~477 |
| 10 × 5 | 478~777 |
| LOSE | 778~5998 |

BASE GAME PAYOUT TABLE

| WINNING COMBINATION | PAYOUT (COINS ARE PAID OUT) |
|---|---|
| BONUS GAME IS TRIGGERED THREE OR MORE SYMBOLS OF "SUN" ARE DISPLAYED | PROCEED TO BONUS GAME |
| ♥ × 5 | 50 COINS |
| ☾ × 5 | 30 COINS |
| K × 5 | 25 COINS |
| A × 5 | 20 COINS |
| Q × 5 | 15 COINS |
| J × 5 | 10 COINS |
| 10 × 5 | 5 COINS |
| LOSE | 0 COIN |

BONUS GAME WINNING COMBINATION
LOTTERY TABLE

| THE NUMBER OF SPECIAL SYMBOLS | RANDOM NUMBER TABLE |
|---|---|
| 0 | 8217~11999 |
| 1 | 6217~8216 |
| 2 | 5217~6216 |
| 3 | 4117~5216 |
| 4 | 3417~4116 |
| 5 | 2817~3416 |
| 6 | 2217~2816 |
| 7 | 1617~2216 |
| 8 | 1111~1616 |
| 9 | 706~1110 |
| 10 | 402~705 |
| 11 | 168~401 |
| 12 | 48~167 |
| 13 | 17~47 |
| 14 | 6~16 |
| 15 | 0~5 |

BONUS GAME PAYOUT TABLE

| THE NUMBER OF SPECIAL SYMBOLS | PAYOUT (COINS ARE PAID OUT) |
|---|---|
| 0 | 0 COIN |
| 1 | 5 COINS |
| 2 | 10 COINS |
| 3 | 15 COINS |
| 4 | 20 COINS |
| 5 | 25 COINS |
| 6 | 30 COINS |
| 7 | 35 COINS |
| 8 | 40 COINS |
| 9 | 45 COINS |
| 10 | 50 COINS |
| 11 | 55 COINS |
| 12 | 60 COINS |
| 13 | 65 COINS |
| 14 | 70 COINS |
| 15 | 75 COINS |

ANSWER TABLE 134

| EXTRACTED TENTATIVE WORD (KEYWORD) | ANSWER |
|---|---|
| START | WIN NEXT! |
| BONUS | THREE SUNS, AND YOU CAN GET BONUS GAME! |
| PAYOUT | FIVE HEARTS, AND YOU CAN GET FIVE TIMES! |
| ⋮ | ⋮ |
| UP | VOLUME WILL BE TURNED UP BY 1 LEVEL |
| DOWN | VOLUME WILL BE TURNED DOWN BY 1 LEVEL |
| OOPS! | ALMOST |
| END | MAKE UP NEXT TIME! |

135 — EXTRACTED TENTATIVE WORD (KEYWORD); 136 — ANSWER

GAMING MACHINE WITH DIALOG OUTPUTTING METHOD TO VICTORY OR DEFEAT OF GAME AND CONTROL METHOD THEREOF

CROSS REFERENCE TO RELATED APPLICATION

The present application claims priority from provisional application No. 61/027,236, which was filed on Feb. 8, 2008, the entire disclosure of which is herein incorporated by reference.

BACKGROUND OF THE INVENTION

1. Field of the Invention

The present invention relates to a gaming machine, and a playing method thereof.

2. Description of Related Art

In a conventional slot machine, when a player inserts a game medium such as a coin, a bill, or the like, into an insertion slot of the slot machine and inputs a spin button, several symbols are scrollingly displayed on a display which is provided on a front face of a cabinet, and then the respective symbols are automatically stopped.

In such a slot machine, when a predetermined combination of symbols is stopped on a winning line, a predetermined number of game media are paid out, as disclosed in specifications of U.S. Pat. No. 6,604,999B2, U.S. Patent Application Publication No. 2002065124A1, or U.S. Patent Application Publication No. 20040053676A1 for example. This type of slot machine produces an effect of generating expectation for paying out of the gaming medium. For example, a background image is changed, or various characters are introduced, to cause player's expectation for a jackpot. Like this, producing an effect of causing player's expectation is a large factor in improving attraction of the slot machine.

In this respect, Japanese Unexamined Patent Publication No. 2004-135901 or Japanese Unexamined Patent Publication No. 2007-007172 discloses such a gaming machine that, for the purpose of improving presentation effect, when a predetermined condition occurs a player inputs a voice into a microphone, to thereby change an effect.

However, in this gaming machine, simply, effect is determined in accordance with utterance of the player. It has not been possible to produce such an effect that a stream of talks, topics, or the like which is prepared in advance is successively outputted to the player while responding to the utterance of the player.

On the other hand, U.S. Patent Application Publication No. 20070094007, U.S. Patent Application Publication No. 20070094008, U.S. Patent Application Publication No. 20070094005, and U.S. Patent Application Publication No. 20070094004 disclose a conversation controller which can successively output to a user a stream of talks, topics, or the like which is prepared in advance, while responding to utterance of the user.

Thus, an object of the present invention is to provide a gaming machine having entertainmentness unobtainable from the above-mentioned prior art and a controlling method thereof, by providing the conversation controller to the gaming machine so that in response to player's utterance an answer is outputted to the player in an output mode corresponding to increase/decrease of a game value during a game.

SUMMARY OF THE INVENTION

According to the present invention, there is provided a gaming machine including: a conversation device which recognizes a voice of a player and outputs an answer in accordance with the recognized voice; an input device which inputs a voice; an output device which outputs a voice; a volume adjusting device which adjusts volume of voice to be outputted from the output device; a game value memory device which stores therein the number of game values given and the number of game values consumed; a transmitting device which transmits to outside a difference between the total number of game values given and the total number of game values consumed, as a game value difference; a receiving device which receives a game value difference from outside; and a controller which is programmed to operate in the steps of: (a1) sequentially storing the number of game values consumed per unit game; (a2) sequentially storing the number of game values given per unit game; (a3) calculating a difference between the total number of game values given and the total number of game values consumed, as a self game value difference; (a4) transmitting the self game value difference to outside; (a5) receiving someone's game value difference from outside; and (a6) when the self game value difference and the someone's game value difference are in a predetermined relationship, voice-outputting, by the conversation device, an answer at volume corresponding to the predetermined relationship from the output device in response to a voice input through the input device.

With the above-described structure, when the self game value difference, which is a difference between the total number of game values given and the total number of game values consumed, and the someone's game value difference are in the predetermined relationship, the gaming machine can voice-output the answer at volume corresponding to the predetermined relationship from the output device, in response to a voice input through the input device. Therefore, in response to a voice input made by a player, the gaming machine can output an answer at volume corresponding to increase/decrease of the game value which occurs during the game. That is, the gaming machine can voice-output an answer at volume considering win or lose of a neighboring player. This may allow the player to continue the game without being offended.

According to the present invention, in addition, in the above-described gaming machine, under a predetermined condition, the controller deletes the numbers of game values given and consumed which have been stored in the game value memory device.

With the above-described structure, when the predetermined condition is satisfied, the number of game values given and consumed, which have been stored in the game value memory device, can be deleted. As a result, win or lose of the game by the player can be once reset.

According to the present invention, there is provided a gaming machine including: a conversation device which recognizes a voice of a player and outputs an answer in accordance with the recognized voice; an input device which inputs a voice; an output device which outputs a voice; a volume adjusting device which adjusts volume of voice to be outputted from the output device; a game value memory device which stores therein the number of game values given and the number of game values consumed; a transmitting device which transmits to outside a difference between the total number of game values given and the total number of game values consumed, as a game value difference; a receiving device which receives a game value difference from outside; and a controller which is programmed to operate in the steps of: (b1) sequentially storing the number of game values consumed per unit game; (b2) sequentially storing the number of game values given per unit game; (b3) calculating a difference between the total number of game values given and the total number of game values consumed, as a self game value difference; (b4) transmitting the self game value difference to outside; (b5) receiving someone's game value difference from outside; (b6) voice-outputting, by the conversation device, an answer at reduced volume from the output device in response to a voice input through the input device, when the self game value difference is smaller than "0" while the someone's game value difference is equal to or greater than "0"; and (b7) voice-outputting, by the conversation device, an answer at increased volume from the output device in response to a voice input through the input device, when the self game value difference is equal to or greater than "0" while the someone's game value difference is smaller than "0".

With the above-described structure, when the self game value difference is smaller than "0" while the someone's game value difference is equal to or greater than "0", an answer can be voice-outputted at reduced volume from the output device in response to a voice input through the input device. When the self game value difference is equal to or greater than "0" while the someone's game value difference is smaller than "O", an answer can be voice-outputted at increased volume from the output device in response to a voice input through the input device. For example, when a player is winning a game and a neighboring player is losing a game, the gaming machine can voice-output an answer at increased volume from the output device in response to a voice input, while when a player is losing a game and a neighboring player is winning a game, the gaming machine can voice-output an answer at reduced volume from the output device in response to a voice input. As a result, the gaming machine can voice-output an answer at volume considering win or lose of the neighboring player. This may allow the player to continue the game without being offended.

According to the present invention, in the above-described gaming machine, under a predetermined condition, the controller deletes the numbers of game values given and consumed which have been stored in the game value memory device.

With the above-described structure, when the predetermined condition is satisfied, the number of game values given and consumed, which have been stored in the game value memory device, can be deleted. As a result, win or lose of the game by the player can be once reset.

According to the present invention, there is provided a gaming machine including: a conversation device which recognizes a voice of a player and outputs an answer in accordance with the recognized voice; an input device which inputs a voice; a voice output device which outputs a voice; a display device which displays an answer; a switching device which switches between the voice output device and the display device; a game value memory device which stores therein the number of game values given and the number of game values consumed; a transmitting device which transmits to outside a difference between the total number of game values given and the total number of game values consumed, as a game value difference; a receiving device which receives a game value difference from outside; and a controller which is programmed to operate in the steps of: (c1) sequentially storing the number of game values consumed per unit game; (c2) sequentially storing the number of game values given per unit game; (c3) calculating a difference between the total number of game values given and the total number of game values consumed, as a self game value difference; (c4) transmitting the self game value difference to outside; (c5) receiving someone's game value difference from outside; (c6) switching a device for outputting an answer to the voice output device or the display device in accordance with a relationship between the self game value difference and the someone's game value difference; and (c7) outputting, by the conversation device, an answer through the voice output device or the display device thus switched, in response to a voice input through the input device.

With the above-described structure, the gaming machine can switch the device for outputting an answer to the voice output device or the display device in accordance with a relationship between the self game value difference, which is a difference between the total number of game values given and the total number of game values consumed, and the someone's game value difference, and can output the answer through the voice output device or the display device thus switched, in response to a voice input through the input device. Therefore, in response to a voice input made by a player, the gaming machine can output an answer through the voice output device or the display device, which corresponds to increase or decrease of the game value during the game. That is, the gaming machine can output an answer in an output mode considering win or lose of the neighboring player. This may allow the player to continue the game without being offended.

According to the present invention, in the above-described gaming machine, under a predetermined condition, the controller deletes the numbers of game values given and consumed which have been stored in the game value memory device.

With the above-described structure, when the predetermined condition is satisfied, the number of game values given and consumed, which have been stored in the game value memory device, can be deleted. As a result, win or lose of the game by the player can be once reset.

According to the present invention, there is provided a gaming machine including: a conversation device which recognizes a voice of a player and outputs an answer in accordance with the recognized voice; an input device which inputs a voice; a voice output device which outputs a voice; a display device which displays an answer; a switching device which switches between the voice output device and the display device; a game value memory device which stores therein the number of game values given and the number of game values consumed; a transmitting device which transmits to outside a difference between the total number of game values given and the total number of game values consumed, as a game value difference; a receiving device which receives a game value difference from outside; and a controller which is programmed to operate in the steps of: (d1) sequentially storing the number of game values consumed per unit game; (d2) sequentially storing the number of game values given per unit game; (d3) calculating a difference between the total number of game values given and the total number of game values consumed, as a self game value difference; (d4) transmitting the self game value difference to outside; (d5) receiving someone's game value difference from outside; (d6) switching, by the conversation device, a device for outputting an answer to the display device, when the self game value difference is smaller than "0" while the someone's game value difference is equal to or greater than "0"; (d7) switching, by the conversation device, a device for outputting an answer to the voice output device, when the self game value difference is equal to or greater than "0" while the someone's game value difference is smaller than "0"; and (d8) outputting, by the conversation device, an answer through the voice output device or the display device thus switched, in response to a voice input through the input device.

With the above-described structure, when the self game value difference is smaller than "0" while the someone's game value difference is equal to or greater than "0", the gaming machine can switch an output mode of the answer to the display device. When the self game value difference is equal to or greater than "0" while the someone's game value difference is smaller than "0", the gaming machine can switch an output mode of the answer to the voice output device. Therefore, in response to a voice input made by a player, the gaming machine can output an answer through the voice output device or the display device, which corresponds to increase or decrease of the game value during the game. That is, the gaming machine can output an answer in an output mode considering win or lose of the neighboring player. This may allow the player to continue the game without being offended.

According to the present invention, in the above-described gaming machine, under a predetermined condition, the controller deletes the numbers of game values given and consumed which have been stored in the game value memory device.

With the above-described structure, when the predetermined condition is satisfied, the number of game values given and consumed, which have been stored in the game value memory device, can be deleted. As a result, win or lose of the game by the player can be once reset.

According to the present invention, there is provided a control method of a gaming machine, including the steps of: sequentially storing the number of game values consumed per unit game; sequentially storing the number of game values given per unit game; calculating a difference between the total number of game values given and the total number of game values consumed, as a self game value difference; transmitting the self game value difference to outside; receiving someone's game value difference from outside; and when the self game value difference and the someone's game value difference are in a predetermined relationship, voice-outputting, by a conversation device, an answer at volume corresponding to the predetermined relationship from an output device in response to a voice input through an input device.

With the above-described control method of a gaming machine, the gaming machine can be controlled in such a manner that, when the self game value difference, which is a difference between the total number of game values given and the total number of game values consumed, and the someone's game value difference are in the predetermined relationship, the gaming machine voice-outputs the answer at volume corresponding to the predetermined relationship from the output device, in response to a voice input through the input device. Therefore, in response to a voice input made by a player, the gaming machine can output an answer at volume corresponding to increase/decrease of the game value which occurs during the game. That is, the gaming machine can voice-output an answer at volume considering win or lose of the neighboring player. This may allow the player to continue the game without being offended.

BRIEF DESCRIPTION OF THE DRAWINGS

FIG. 8 is an explanatory view showing a base game winning combination lottery table;

FIG. 9 is an explanatory view showing a base game payout table;

FIG. 10 is an explanatory view showing a bonus game winning combination lottery table;

FIG. 11 is an explanatory view showing a bonus game payout table;

FIG. 18 is an explanatory view showing an answer table;

DESCRIPTION OF THE PREFERRED EMBODIMENTS

A gaming machine and a controlling method thereof according to the present invention will be described.

Figure 1:
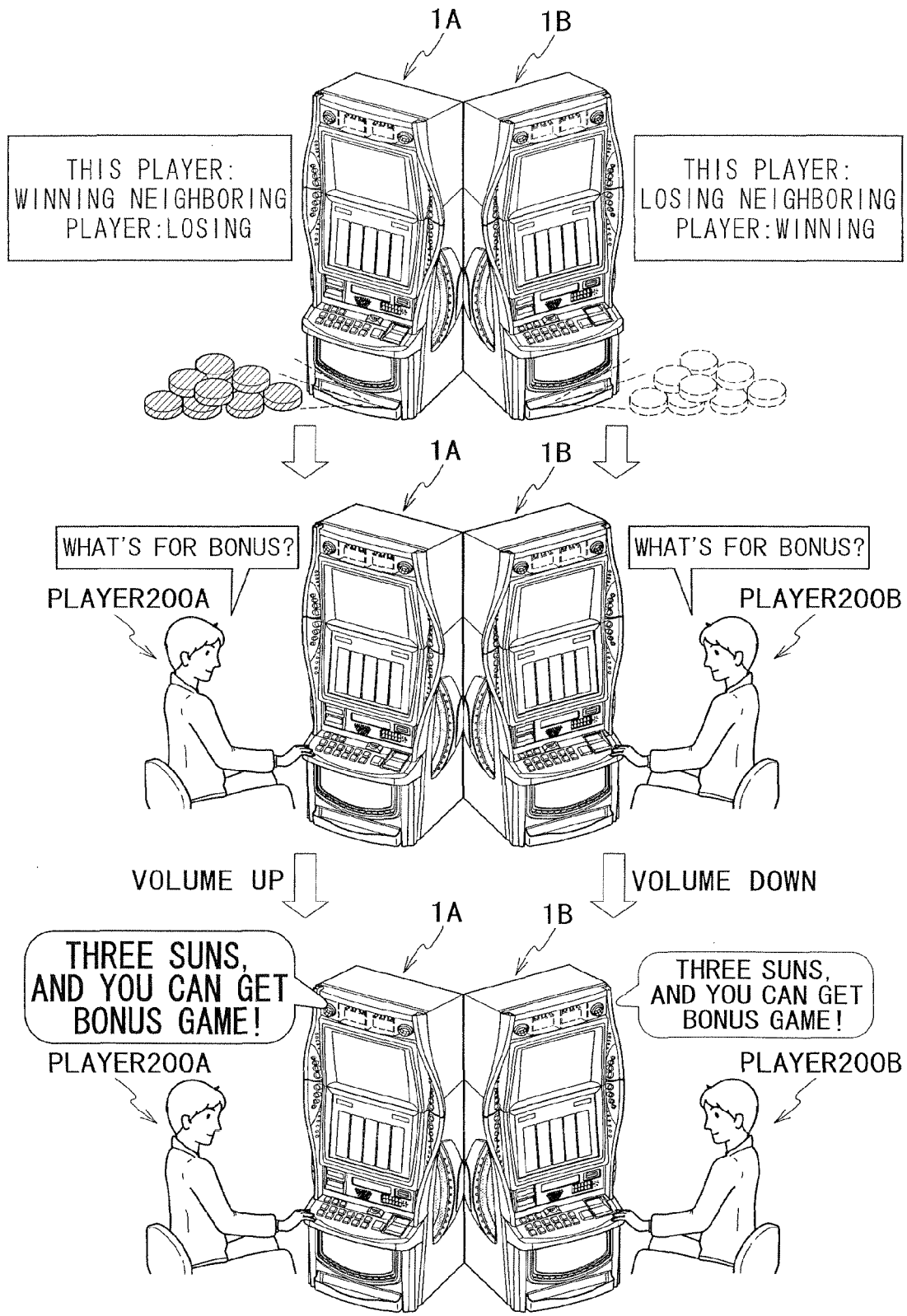
FIG. 1 is an explanatory view showing a method of operating a slot machine according to a first embodiment.

As shown in FIG. 1, the present invention is embodied as a gaming machine 100 and a control method of the gaming machine 100, including the steps of: sequentially storing the number of game values consumed per unit game; sequentially storing the number of game values given per unit game; calculating a difference between the total number of game values given and the total number of game values consumed, as a self game value difference; transmitting the self game value difference to outside; receiving someone's game value difference from outside; when the self game value difference and the someone's game value difference are in a predetermined relationship, voice-outputting, by a conversation device, an answer at volume corresponding to the predetermined relationship from an output device in response to a voice input through an input device; and under a predetermined condition, deleting the stored numbers of game values given and consumed.

Figure 2:
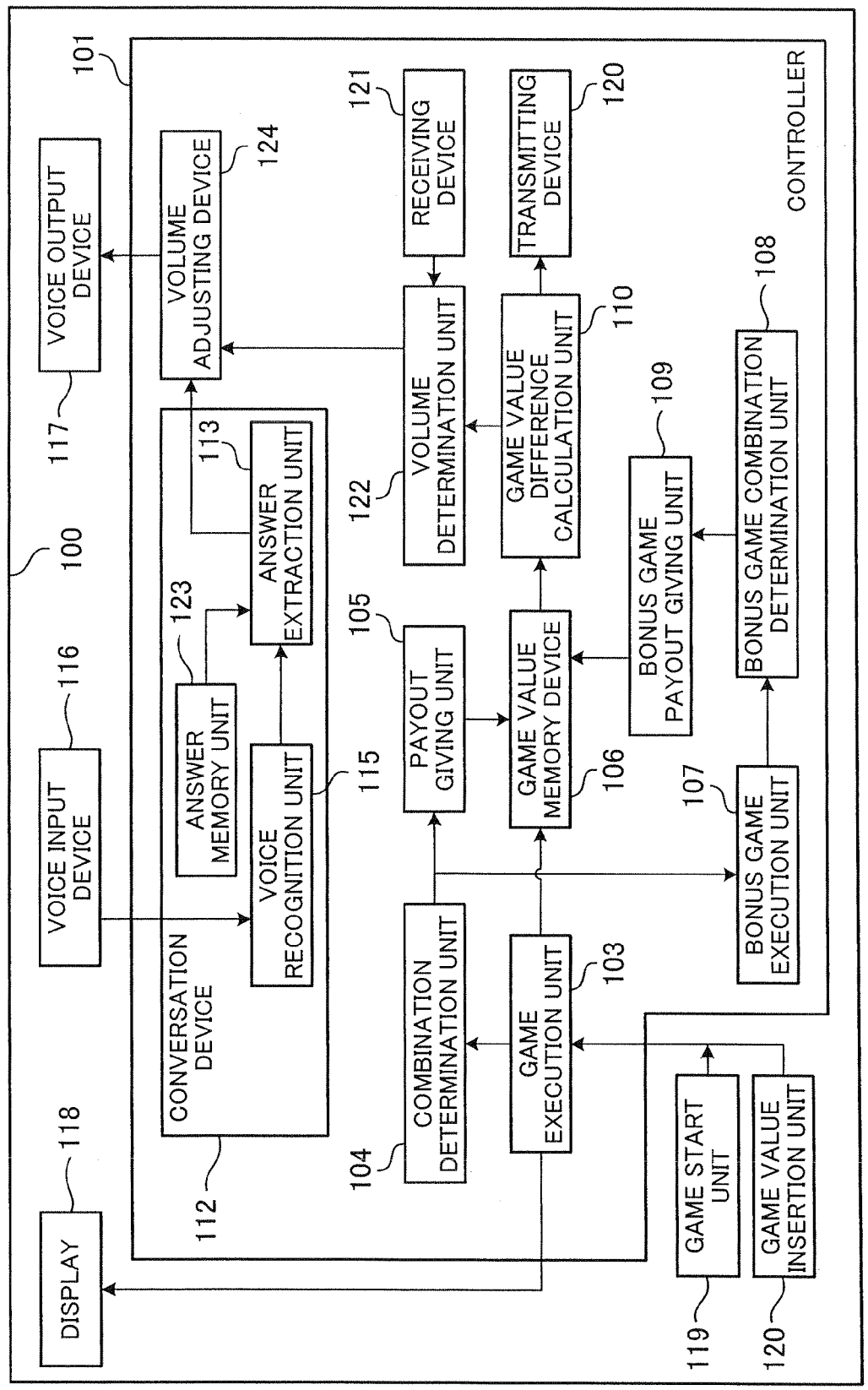
FIG. 2 is a block diagram of a gaming machine.

As shown in FIG. 2, the gaming machine 100 which executes the above-described control method includes a game start unit 119, a game value insertion unit 102, a controller 101, a voice input device 116, a voice output device 117, and a display 118. The display 118 is adapted to have several symbols 180 displayed thereon. The symbols 180 include symbols 181 to 188 and special symbols 189.

Here, "arranging" means a state where the symbols 180 can be visually observed by an outside player. That is, it means a state where the symbols 180 are displayed in display windows 151 to 155, in FIG. 3. Arranging the symbols 180 again after dismissing the symbols 180 is referred to as "rearranging".

The display 118 may have a mechanical structure with a reel device for arranging the symbols 180 by rotation of a reel or an electrical structure for arranging the symbols 180 by an image-displayed video reel. Further, the display 118 may be a combination of the mechanical structure (reel) and the electrical structure (video reel). The electrical structure may include a liquid crystal display device, a CRT (cathode-ray tube), a plasma display device, and the like. In addition, the number of display windows 151 to 155 may be arbitrary. A specific structure of the display 118 will be described later.

[Controller 101]

The controller 101 is adapted to execute: a first process for sequentially storing the number of game values consumed per unit game; a second process of sequentially storing the number of game values given per unit game; a third process of calculating a difference between the total number of game values given and the total number of game values consumed, as a self game value difference; a fourth process for transmitting the self game value difference to outside; a fifth process for receiving someone's game value difference from outside; a sixth process for, when the self game value difference and the someone's game value difference are in a predetermined relationship, voice-outputting, by a conversation device, an answer at volume corresponding to the predetermined relationship from an output device in response to a voice input through an input device; and a seventh process for, under a predetermined condition, deleting the stored numbers of game values given and consumed. In other words, the controller 101 includes seven processing units.

The above-described controller 101 has a game execution unit 103, a combination determination unit 104, a payout giving unit 105, a game value memory device 106, a bonus game execution unit 107, a bonus game combination determination unit 108, a bonus game payout giving unit 109, a game value difference calculation unit 110, a volume determination unit 122, a volume adjusting device 124, a conversation device 112, a receiving device 121, and a transmitting device 120. The conversation device 112 has a voice recognition unit 115, an answer extraction unit 113, and an answer memory unit 123.

[Operation of Controller 101]

The controller 101 having the above-described structure will be described. First, triggered by a game start signal from the game start unit 119, the game execution unit 103 starts to variably display the symbols 180 which have been arranged on the display 118, and rearranges several symbols 180 at a timing when a predetermined period of time elapses after starting the variable display. That is, the controller 101 executes a unit game in which several symbols 180 are rearranged based on a predetermined timing. The game value inserted by the game value insertion unit 102 is stored in the game value memory device 106. That is, the controller 101 executes the first process.

The game value as a payout which has been given by the payout giving unit 105 based on a game result determined by the combination determination unit 104 is stored in the game value memory device 106. That is, the controller 101 executes the second process.

The game value difference calculation unit 110 calculates a difference between the game value given by the payout giving unit 105 as a payout and the game value inserted by the game value insertion unit 102, which have been stored in the game value memory device 106. That is, the controller 101 executes the third process.

The transmitting device 120 transmits the game value difference which has been calculated in the third process to a neighboring gaming machine. That is, the controller 101 executes the fourth process.

The receiving device 121 receives a game value difference which has been calculated in another gaming machine 100. That is, the controller 101 executes the fifth process.

The volume determination unit 122 determines whether the game value difference calculated in the third process and the game value difference calculated in another gaming machine and received in the fifth process are in a predetermined relationship or not. When they are in the predetermined relationship, in response to a voice input through the voice input device 116, the voice recognition unit 115 recognizes a voice, and the answer extraction unit 113 extracts an answer corresponding to the recognized voice from the answer memory unit 123. The volume adjusting device 124 adjusts volume so as to correspond to the predetermined relationship, and the answer is voice-outputted from the voice output device 117. That is, the controller 101 executes the sixth process.

The number of game values given and the number of game values consumed which have been stored in the game value memory device 106 are deleted, on condition that, as a result of a bonus game executed by the bonus game execution unit 107, the bonus game payout giving unit 109 gives a game value as a payout for the bonus game based on a combination determined by the bonus game combination determination unit 108. That is, the controller 101 executes the seventh process.

Each block of the controller 101 may be formed of hardware, or may be formed of software if necessary.

As is clear from the above-described operation, realized are the gaming machine 100 and the control method of the gaming machine 100, including the steps of: sequentially storing the number of game values consumed per unit game; sequentially storing the number of game values given per unit game; calculating a difference between the total number of game values given and the total number of game values consumed, as a self game value difference; transmitting the self game value difference to outside; receiving someone's game value difference from outside; when the self game value difference and the someone's game value difference are in a predetermined relationship, voice-outputting, by a conversation device, an answer at volume corresponding to the predetermined relationship from an output device in response to a voice input through an input device; and under a predetermined condition, deleting the stored numbers of game values given and consumed.

According to the above-described structure, when the self game value difference, which is a difference between the total number of game values given and the total number of game values consumed, and someone's game value difference are in the predetermined relationship, the gaming machine 100 can voice-output the answer at volume corresponding to the predetermined relationship from the voice output device 117, in response to a voice input through the voice input device 116. Therefore, in response to a voice input made by a player, the gaming machine 100 can output an answer at the volume corresponding to increase/decrease of the game value which occurs during the game. That is, the gaming machine 100 can voice-output an answer at volume considering win or lose of a neighboring player. This may allow the player to continue the game without being offended.

When the predetermined condition is satisfied, the number of game values given and consumed, which have been stored in the game value memory device 106, can be deleted. As a result, win or lose of the game by the player can be once reset.

First Embodiment

[Mechanical Structure of Slot Machine 1]

Next, a description will be given to a first embodiment which is implemented by applying the gaming machine 100 having the above-described structure to a slot machine 1 and mechanically and electrically structuring it in a specific manner. Since a slot machine 1A and a slot machine 1B shown in FIG. 1 have the same structure, they will be referred to as a slot machine 1 in the following description.

Figure 5:
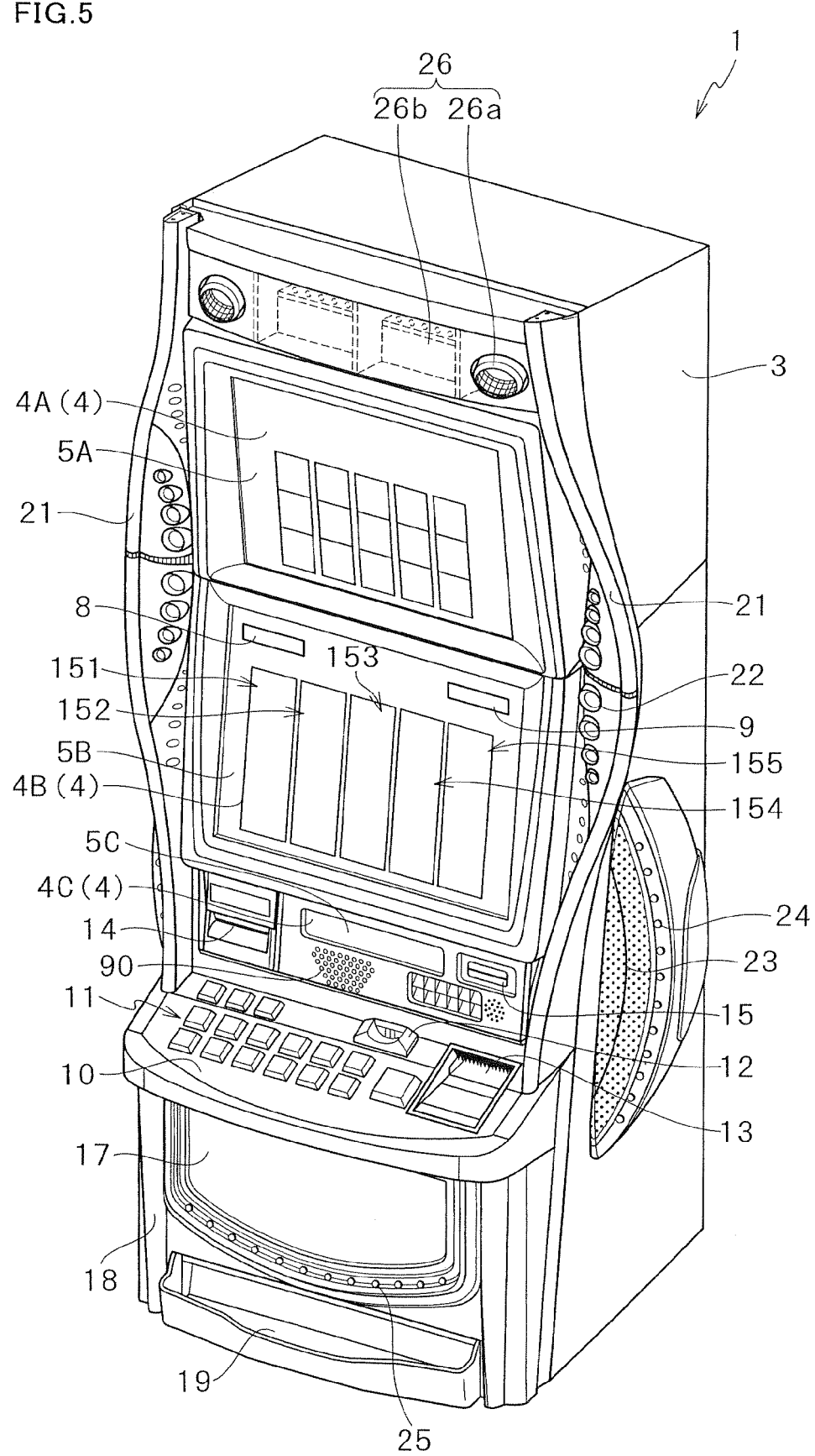
FIG. 5 is a perspective view showing an external appearance of the slot machine.

As shown in FIG. 5, a slot machine 1 of this embodiment is an upright-type slot machine provided in a game arcade such as casino and the like, and has a cabinet 3 which receives electrical or mechanical parts for executing a predetermined game mode. As a display unit 4 for displaying game information based on a game operation of a player, provided are an upper variable display unit 4A, a central variable display unit 4B and a lower variable display unit 4C, for example. Each of the display units 4A, 4B, 4C is attached to a front face of the cabinet 3 which is elongated in a longitudinal direction.

The upper variable display unit 4A is a display unit on which a player fixes his/her eyes during the unit game, and has a transparent upper liquid crystal panel 5A which is fixed to a front door of the cabinet 3. A variety of effect images are displayed on the upper liquid crystal panel 5A during the unit game. For example, an effect of a moving picture is presented in the upper liquid crystal panel 5A when a win is made or the like.

The central variable display unit 4B is a rotating-symbol display panel on which a player always fixes the eyes and has a transparent central liquid crystal panel 5B which is fixed to the front door of the cabinet 3. Five display windows 151 to 155 are displayed on the central liquid crystal panel 5B. Moreover, a payout-number display unit 8 and a credit-number display unit 9 are displayed in an upper part of the central liquid crystal panel 5B. The variable display unit 4B corresponds to the display 118 shown in FIG. 2.

The lower variable display unit 4C has a lower liquid crystal panel 5C which displays thereon a point-number recorded in a card or a point-number of a game. A numerical value displayed in the lower liquid crystal panel 5C is based on a display result of the central variable display unit 4B. When a winning combination (a combination which makes a win)is made in the central variable display unit 4B, a point-number of a game displayed in the lower liquid crystal panel 5C is added up based on the winning combination made (see FIG. 9). A ticket printer 14 is provided on a left side of the lower liquid crystal panel 5C, and a card reader 15 is provided on a right side of the lower liquid crystal panel 5C.

An operation table 10 which protrudes forward from the front face of the cabinet 3 is disposed below the lower variable display unit 4C. On the operation table 10, there are arranged operation buttons 11 (for example, a BET button, a collect button, a start button, and the like) as an operation unit enabling a player to operate a game. In addition, a coin insertion slot 12 and a bill insertion slot 13 are provided on the operation table 10. The operation buttons 11 corresponds to the game start unit 119 shown in FIG. 2.

A waist-position panel 17 is disposed below the operation table 10. The waist-position panel 17 is a plastic panel having a game-related image printed thereon. The waist-position panel 17 is fixed to a lower front door 18 and illuminated by a cold cathode-ray tube. In addition, a coin receiving tray 19 for collecting coins, which are paid out based on a game result, is disposed below the waist-position panel 17.

Furthermore, a light-emitting unit 20 is disposed on the cabinet 3 of the slot machine 1 so as to surround a game area including the upper variable display unit 4A, the central variable display unit 4B, the lower variable display unit 4C, and the operation table 10. The light-emitting unit 20 includes side lamps 22, speaker lamps 24, under lamps 25, and top lamps 26. The side lamps 22 are provided on inclined parts 21, which protrude in a bow shape at front right and left ends of the cabinet 3 and at side parts extending over the upper variable display unit 4A, the central variable display unit 4B and the lower variable display unit 4C. The speaker lamps 24 are provided on arc-shaped speakers 23, which protrude sideways at the right and left ends of the cabinet 3 adjacent to the operation table 10. The speaker lamps 24 are arranged along edges of the speakers 23. The under lamps 25 are provided on a lower front door 18, and arranged along a lower edge of the waist-position panel 17. The top lamps 26 are provided above the upper variable display unit 4A. The top lamps 26 have power lamps 26a disposed at both sides, and central band-shaped lamps 26b arranged in a horizontal direction.

[Electrical Structure of Slot Machine 1: Main Control Board 71]

Figure 6:
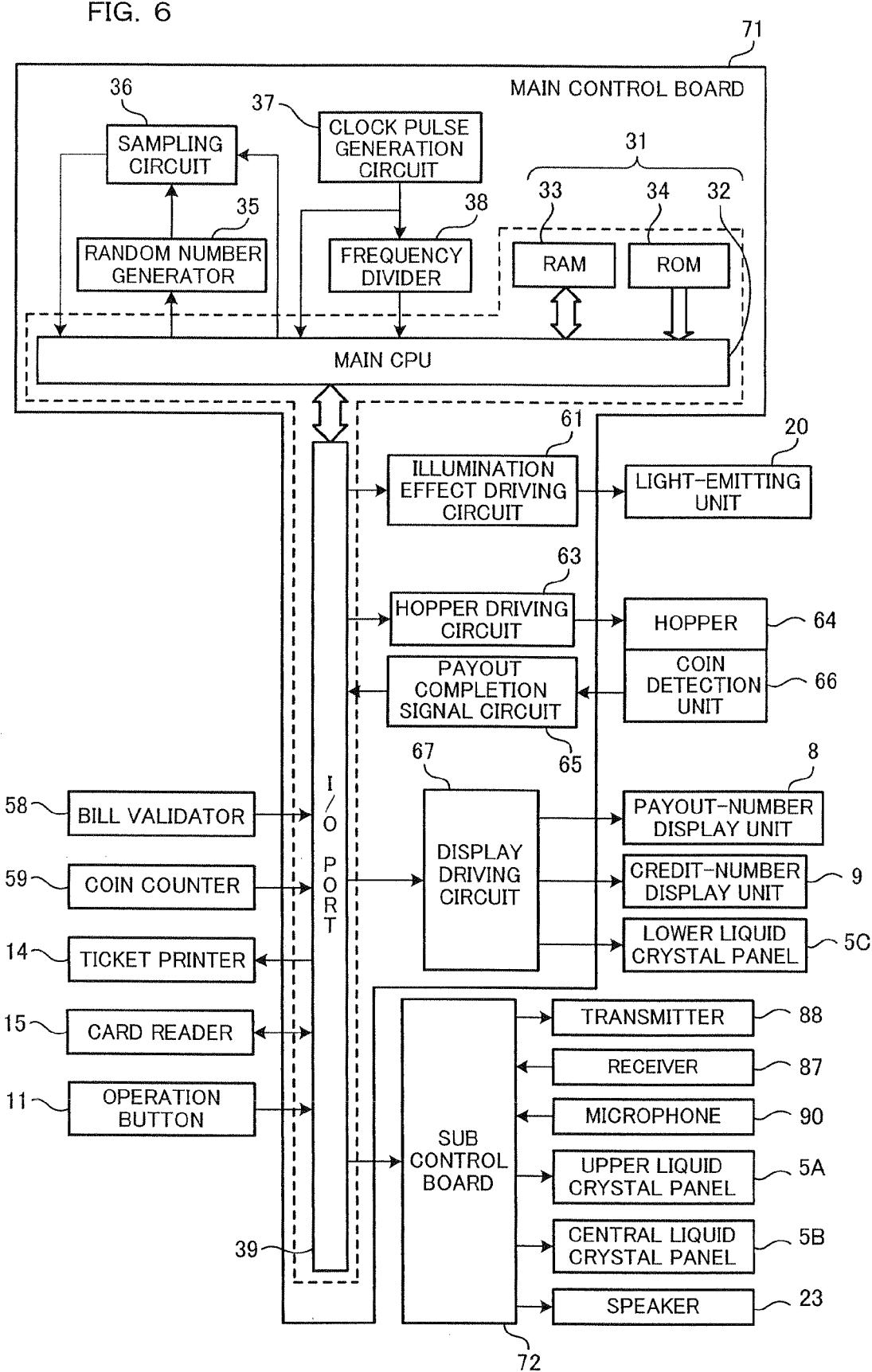
FIG. 6 is a block diagram showing an electrical structure of the whole slot machine.

FIG. 6 is a block diagram showing an electrical structure of the whole slot machine 1. As shown in FIG. 6, the slot machine 1 has several components centering on a main control board 71 including a microcomputer 31. The main control board 71 has a microcomputer 31, a random number generator 35, a sampling circuit 36, a clock pulse generating circuit 37, a frequency divider 38, an illumination effect driving circuit 61, a hopper driving circuit 63, a payout completion signal circuit 65 and a display unit driving circuit 67. The main control board 71 corresponds to the controller 101 shown in FIG. 2.

The microcomputer 31 has a main CPU 32, a RAM 33, and a ROM 34. The main CPU 32 operates in accordance with a program stored in the ROM 34, and executes an input/output of a signal to and from the other components through an I/O port 39, thereby controlling an overall operation of the slot machine 1. The microcomputer 31 corresponds to the game execution unit 103, the combination determination unit 104, the payout giving unit 105, the bonus game execution unit 107, the bonus game combination determination unit 108, and the bonus game payout giving unit 109 shown in FIG. 2.

Stored in the RAM 33 are data used when the main CPU 32 operates, lottery tables such as a base game winning combination lottery table 130 and a bonus game winning combination lottery table 132 which will be described later, and programs such as a stop symbol determination program, a bonus game determination program, and a bonus game stop symbol determination program. For example, a random number which is sampled by a later-described sampling circuit 36 is temporarily kept after the game start, and in addition code numbers of reels R1, R2, and R3 are stored. Moreover, the RAM 33 adds up the number of coins bet, and stores it therein. Further, the RAM 33 adds up the number of coins paid out, and stores it therein. The RAM 33 corresponds to the game value memory device 106.

The ROM 34 stores therein programs of a first game execution process (a second game execution process), a bonus game process, and the like which are executed by the main CPU 32, and permanent data. The ROM 34 also stores therein a base game payout table 131 and a bonus game payout table 133.

The random number generator 35 is operated in accordance with a command from the main CPU 32, to generate a random number within a predetermined range. In accordance with a command from the main CPU 32, the sampling circuit 36 samples an arbitrary random number from random numbers generated by the random number generator 35, and inputs the random number thus sampled into the main CPU 32. The sampled random number is used in a first game execution process (a second game execution process), a bonus game process, and the like, which will be described later. The clock pulse generating circuit 37 generates a reference clock for operating the main CPU 32, and the frequency divider 38 inputs a signal, which is obtained by dividing the reference clock at a constant period, to the main CPU 32.

Operation buttons 11 including a start button for inputting a command to start scrolling a column of symbols, a collect button, a BET button, and the like are connected to the main control board 71, so that signals corresponding to pushes of these buttons are inputted through the I/O port 39 to the main CPU 32.

In addition, a bill validator 58, a coin counter 59, a ticket printer 14, and a card reader 15 are connected to the main control board 71.

The bill validator 58 reads an image of a bill inserted into the bill insertion slot 13, and accepts a normal bill into the cabinet 3. In addition, when accepting a normal bill, the bill validator 58 outputs an input signal to the main CPU 32 based on an amount of the bill. The main CPU 32 stores into the RAM 33 a credit-number corresponding to the amount of the bill transmitted by the input signal.

The coin counter 59 is provided within the coin insertion slot 12, and identifies whether the coin inserted into the coin insertion slot 12 by the player is normal or not. Anything other than the normal coin is ejected into the coin receiving tray 19. In addition, when detecting a normal coin, the coin counter 59 outputs an input signal to the main CPU 32. The coin counter corresponds to the game value insertion unit 102 shown in FIG. 2.

Based on a control signal outputted from the main CPU 32, the ticket printer 14 prints a barcode on a ticket, and then outputs it as a barcoded ticket. The barcode is a coded form of data such as a credit-number stored in the RAM 33, time and date, an identification number of the slot machine 1, and the like.

The card reader 15 reads data from a smart card, and transmits the data to the main CPU 32, or writes data into the smart card based on a control signal from the main CPU 32.

The illumination effect driving circuit 61 outputs an effect signal for causing the above-described light-emitting unit 20 to execute an illumination effect. The light-emitting unit 20 is made up of several lamps or LEDs including the side lamps 22, the speaker lamps 24, the under lamps 25 and the top lamps 26 described above.

The hopper driving circuit 63 drives a hopper 64 under control of the main CPU 32. The hopper 64 executes an operation of paying out a coin, to make a coin paid out into the coin receiving tray 19. The payout completion signal circuit 65 inputs coin-number data from a coin detection unit 66 connected thereto and, when the coin-number reaches a predetermined number, inputs to the main CPU 32 a signal notifying that payout of coins is completed. The coin detection unit 66 measures the number of coins paid out by the hopper 64, and inputs data of the measured number to the payout completion signal circuit 65. The display unit driving circuit 67 controls display operations of various display units such as the lower liquid crystal panel 5C.

[Electrical Structure of Slot Machine 1: Sub Control Board 72]

Figure 7:
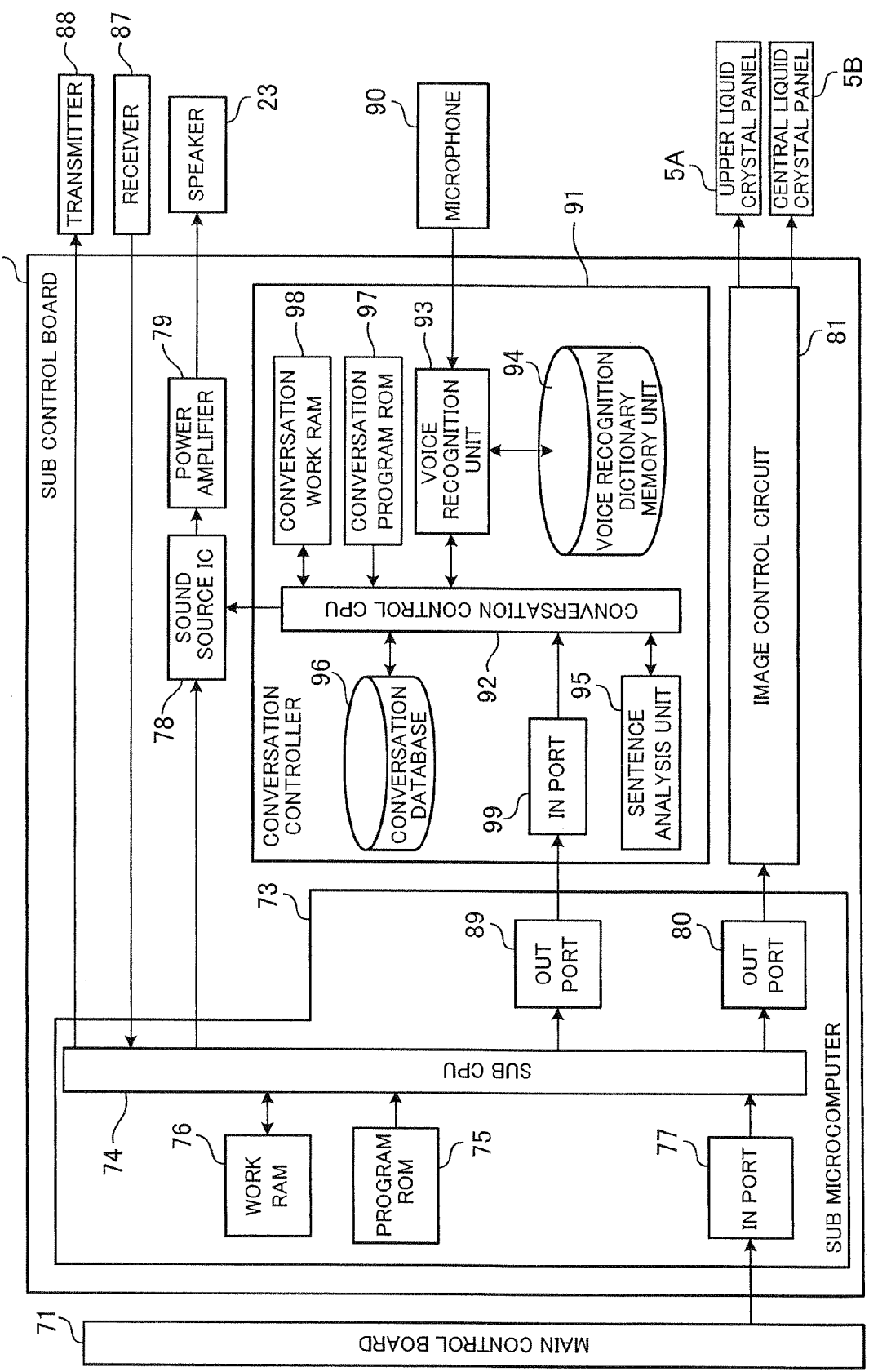
FIG. 7 is a block diagram showing an electrical structure of a sub control board of the slot machine.

A sub control board 72 is further connected to the main control board 71. Based on a command inputted from the main control board 71, the sub control board 72 executes a display control over the upper liquid crystal panel 5A of the variable display unit 4A, a display control over the central liquid crystal panel 5B of the variable display unit 4B, and an output control by the speaker 23, as shown in FIG. 7. The speaker 23 corresponds to the voice output device 117 shown in FIG. 2. In addition, a microphone 90 which acquires a voice input forming utterance of an outside player is connected to the sub control board 72. The microphone 90 corresponds to the voice input device 116 shown in FIG. 2. The sub control board 72 is formed on a circuit board different from a circuit board forming the main control board 71. A main component of the sub control board 72 is a microcomputer (hereinafter referred to as a "submicrocomputer") 73. The sub control board 72 has a sound source IC 78 which controls a voice and volume to be outputted from the speaker 23, a power amplifier 79 which functions as an amplifier, an image control circuit 81 which works as a display control device for the upper liquid crystal panel 5A and the central liquid crystal panel 5B, and a conversation controller 91 which, in response to utterance of a player, sequentially outputs to the player a stream of talks or topics which is prepared in advance. The conversation controller 91 corresponds to the conversation device 112 shown in FIG. 2. Also connected to the sub control board 72 are a transmitter 88 which transmits various information to outside and a receiver 87 which receives various information from outside. The transmitter 88 corresponds to the transmitting device 120 shown in FIG. 2. The receiver 87 corresponds to the receiving device 121 shown in FIG. 2.

The sub microcomputer 73 has a sub CPU 74 which performs a control operation in accordance with a control command transmitted from the main control board 71, a program ROM 75 which serves as a memory device, a work RAM 76, an IN port 77, an OUT port 80, and an OUT port 89. Although the sub control board 72 does not have a clock pulse generating circuit, a frequency divider, a random number generator and a sampling circuit, it is adapted to execute a random number sampling on an operation program of the sub CPU 74. The program ROM 75 stores therein a control program and a later-described first conversation processing program (second conversation processing program), which are executed in the sub CPU 74. The work RAM 76 is adapted to temporarily store therein work data or a flag at a time when the control program is executed in the sub CPU 74. The sub microcomputer 73 corresponds to the game value difference calculation unit 110, the volume determination unit 122, and the volume adjusting device 124 shown in FIG. 2.

The image control circuit 81 has an image control CPU, an image control work RAM, an image control program ROM, an IN port, an image ROM, a video RAM, and an image control IC, though not shown. Based on a parameter set by the submicrocomputer 73 and in accordance with an image control program stored in the image control program ROM, the image control CPU determines images to be displayed on the upper liquid crystal panel 5A and the central liquid crystal panel 5B.

The image control program ROM stores therein various selection tables and an image control program concerning displays on the upper liquid crystal panel 5A and the central liquid crystal panel 5B. The image control work RAM is structured as a temporarily memory device which is used when the image control program is executed in the image control CPU. The image control IC forms an image corresponding to what has been determined by the image control CPU, and outputs the image to the upper liquid crystal panel 5A and the central liquid crystal panel 5B.

The image ROM stores therein dot data for forming images. The video RAM works as a temporarily memory device which is used when the image control IC forms an image.

[Electrical Structure of Slot Machine 1: Conversation Controller]

A conversation controller 91 formed on the sub control board 72 will be described with reference to FIG. 7. The conversation controller 91 allows conversation with a player by outputting an answer in response to player's utterance. Since the conversation controller 91 is already known, a detailed description thereof is omitted here.

As shown in FIG. 7, the conversation controller 91 has an IN port 99, a voice recognition unit 93, a sentence analysis unit 95, a conversation database 96, and a voice recognition dictionary memory unit 94. The conversation controller 91 also has a conversation control CPU 92 which executes a computing process, a conversation work RAM 98, and a conversation program ROM 97. The conversation program ROM 97 stores therein a program for executing a voice recognition process which makes the conversation control CPU 92 function as the conversation controller 91, a program for executing an answer extraction process, a program for making a computer execute other conversation control methods. These programs are loaded onto the conversation work RAM 98 and then executed by the conversation control CPU 92, so that the conversation controller 91 is realized. The conversation control CPU 92 and the sub CPU 74 are connected to each other through the OUT port 89 and the IN port 99.

The microphone 90 which is connected to the voice recognition unit 93 serves to acquire input information inputted by a player. The microphone 90 outputs, as a voice signal, a voice corresponding to acquired utterance (e.g., "Start!"), to the voice recognition unit 93. Here, the microphone 90 may not necessarily be limited to for voices. One for a character input such as a keyboard, a touch panel, or the like may be acceptable. In such a case, it is not necessary to provide the voice recognition unit 93.

[Voice Recognition Unit]

Based on utterance acquired by the microphone 90 (e.g., "What's for bonus?"), the voice recognition unit 93 identifies a character string corresponding to the utterance. More specifically, a voice signal is inputted from the microphone 90 into the voice recognition unit 93. Based on the voice signal thus inputted, the voice recognition unit 93 checks the voice signal against a dictionary which is stored in the voice recognition dictionary memory unit 94. Then, the voice recognition unit 93 outputs a character string signal as a voice recognition result estimated from the voice signal. The voice recognition unit 93 corresponds to the voice recognition unit 115 shown in FIG. 2.

[Voice Recognition Dictionary Memory Unit]The voice recognition dictionary memory unit 94 stores therein character strings which correspond to typical voice signals (such as "What's for bonus?", "Volume up", "End"). The voice recognition unit 93 identifies a character string corresponding to the inputted voice signal, and outputs the character string thus identified ("What's for bonus?") as a character string signal, to the conversation control CPU 92.

[Sentence Analysis Unit]

The sentence analysis unit 95 analyzes the character string identified by the voice recognition unit 93 ("What's for bonus?"). First, the sentence analysis unit 95 divides the character string identified by the voice recognition unit 93, into segments. Here, one segment means one piece of a sentence which is obtained by dividing the character string as small as possible to such an extent that the meaning is kept correct in a grammatical sense. Based on a character string of one segment thus divided, each morpheme which forms a minimum unit of the character string is extracted from the character string of the one segment, as tentative word information (e.g., "bonus", "is", or "what"). Here, in this embodiment, the morpheme means a minimum unit in a structure of a word appearing in the character string. Examples of the minimum unit in a word structure include word classes such as nouns, adjectives, verbs, and the like.

[Conversation Database]

The conversation database 96 stores therein answers corresponding to utterances expected to be inputted by a player, and "keywords" relevant to the answers (e.g., "start", "bonus", "payout", and the like).

Answers 136 to the player are stored in association with the keywords 135. In this embodiment, as shown in the answer table 134 of FIG. 18, answers 136 corresponding to the keywords 135, such as "WIN NEXT!" corresponding to "start", "MAKE UP NEXT TIME!" corresponding to "end", and the like, are stored.

When a certain "keyword" is identified, the conversation controller 91 of this embodiment can search and extract at high speed an answer 136 or the like shown in FIG. 18 which is stored in association with the "keyword", by checking memory contents of the conversation database 96. In this embodiment, the tentative word information extracted by the sentence analysis unit 95 is identified as a "keyword". The conversation database 96 corresponds to the answer memory unit 123 shown in FIG. 2.

[Conversation Control CPU]

The conversation control CPU 92 has functions of controlling data transfer between the respective components in the conversation controller 91 (the voice recognition unit 93, the sentence analysis unit 95, the conversation database 96, the sound source IC 78, and the voice recognition dictionary memory unit 94), and determining and outputting an answer responding to player's utterance. The conversation control CPU 92 corresponds to the answer extraction unit 113 shown in FIG. 2.

By dividing a message for a player (game method explanation texts, operation result notification texts, guidance texts, effect voices, and the like) into several answers, and setting in advance an order of the answers, a plan can be prepared. This enables the answers to be sequentially provided to the player in accordance with player's utterance.

[Base Game Winning Combination Lottery Table]

A base game winning combination lottery table 130 which is used in a basic game will be described with reference to FIG. 8. FIG. 8 is an explanatory view showing a base game winning combination lottery table.

As shown in FIG. 8, a random number used in the base game winning combination lottery table 130 ranges from 0 to 5998. When a random number sampled through the sampling circuit 36 is 0 to 49, a bonus game trigger is won. In this case, three or more symbols of "SUN" 181 are stopped in the display windows 151 to 155 at the same time, and a game state is shifted to a bonus game. When a random number sampled through the sampling circuit 36 is 50 to 51, a winning combination of "HEART" 182 is won. Then, five symbols of "HEART" 182 are stopped in the display windows 151 to 155. When a random number sampled through the sampling circuit 36 is 52 to 57, a winning combination of "MOON" 183 is won. Then, five symbols of "MOON" 183 are stopped in the display windows 151 to 155. Likewise, when a random number is 58 to 97, a winning combination of "K" 186 is won.

When a random number is 98 to 177, a winning combination of "A" 184 is won. When a random number is 178 to 277, a winning combination of "Q" 187 is won. When a random number is 278 to 477, a winning combination of "J" 185 is won. When a random number is 478 to 777, a winning combination of "10" 188 is won. When a random number sampled through the sampling circuit 36 is 778 to 5998, a lose is determined, so that a losing combination of symbols, which is different from any of the above-mentioned winning combinations, is stopped in the display windows 151 to 155. Here, making a win by any of these combinations is referred to as making a winning combination (which makes a win).

[Base Game Payout Table]

Next, a base game payout table 131 will be described with reference to FIG. 9. The base game payout table 131 indicates the number of coins to be paid out for a winning combination determined by the base game winning combination lottery table shown in FIG. 8. FIG. 9 shows a base game payout table.

For a result of sampling using the base game winning combination lottery table 130, coins are paid out in accordance with a winning combination displayed in the display windows 151 to 155 based on the base game payout table 131.

More specifically, when three or more symbols of "SUN" 181 are stopped in the display windows 151 to 155 at the same time, a bonus game is given. When five symbols of "HEART" 182 are stopped in the display windows 151 to 155, fifty coins are paid out. When five symbols of "MOON" 183 are stopped in the display windows 151 to 155, thirty coins are paid out as a payout. Likewise, when five symbols of "K" 186 are stopped in the display windows 151 to 155, twenty-five coins are paid out as a payout. When five symbols of "A" 184 are stopped in the display windows 151 to 155, twenty coins are paid out as a payout. When five symbols of "Q" 187 are stopped in the display windows 151 to 155, fifteen coins are paid out as a payout. When five symbols of "J" 185 are stopped in the display windows 151 to 155, ten coins are paid out as a payout. When five symbols of "10" 188 are stopped in the display windows 151 to 155, five coins are paid out as a payout. When a lottery results in losing, and a losing combination of symbols, which is different from any of the above-mentioned winning combinations, is stopped in the display windows 151 to 155, zero coin is paid out as a payout.

[Bonus Game Winning Combination Lottery Table]

A bonus game winning combination lottery table 132 will be described with reference to FIG. 10. The bonus game winning combination lottery table 132 is applied when a bonus game trigger is won in the base game winning combination lottery table 130. FIG. 10 shows a bonus game winning combination lottery table.

As shown in FIG. 10, a random number used in the bonus game winning combination lottery table 132 ranges from 0 to 11999. When a random number sampled through the sampling circuit 36 is 0 to 5, symbols are stopped in the display windows 151 to 155 in such a manner that there are fifteen special symbols 189 in total. When a random number sampled through the sampling circuit 36 is 6 to 16, symbols are stopped in the display windows 151 to 155 in such a manner that there are fourteen special symbols in total.

Likewise, when a random number is 17 to 47, symbols are stopped in the display windows 151 to 155 in such a manner that there are thirteen special symbols in total. When a random number is 48 to 167, symbols are stopped in the display windows 151 to 155 in such a manner that there are twelve special symbols in total. When a random number is 168 to 401, symbols are stopped in the display windows 151 to 155 in such a manner that there are eleven special symbols in total. When a random number is 402 to 705, symbols are stopped in the display windows 151 to 155 in such a manner that there are ten special symbols in total. When a random number is 706 to 1110, symbols are stopped in the display windows 151 to 155 in such a manner that there are nine special symbols in total. When a random number is 1111 to 1616, symbols are stopped in the display windows 151 to 155 in such a manner that there are eight special symbols in total. When a random number is 1617 to 2216, symbols are stopped in the display windows 151 to 155 in such a manner that there are seven special symbols in total. When a random number is 2217 to 2816, symbols are stopped in the display windows 151 to 155 in such a manner that there are six special symbols in total. When a random number is 2817 to 3416, symbols are stopped in the display windows 151 to 155 in such a manner that there are five special symbols in total. When a random number is 3417 to 4116, symbols are stopped in the display windows 151 to 155 in such a manner that there are four special symbols in total. When a random number is 4117 to 5216, symbols are stopped in the display windows 151 to 155 in such a manner that there are three special symbols in total. When a random number is 5217 to 6216, symbols are stopped in the display windows 151 to 155 in such a manner that there are two special symbols in total. When a random number is 6217 to 8216, symbols are stopped in the display windows 151 to 155 in such a manner that there is one special symbol in total. When a random number sampled through the sampling circuit 36 is 8217 to 11999, it means a lose and symbols are stopped in the display windows 151 to 155 in such a manner that there is zero special symbol in total.

[Bonus Game Payout Table]

Next, a bonus game payout table 133 will be described with reference to FIG. 11. The bonus game payout table 133 indicates the number of coins to be paid out in accordance with the total number of special symbols 189. FIG. 11 shows a bonus game payout table.

As a result of sampling using the bonus game winning combination lottery table 132 shown in FIG. 10, coins are paid out in accordance with the total number of special symbols 189 displayed in the display windows 151 to 155, based on the bonus game payout table 133.

To be more specific, when the total number of special symbols 189 is zero, no coins are paid out. When the total number of special symbols 189 is one, five coins are paid out. When the total number of special symbols 189 is two, ten coins are paid out. When the total number of special symbols 189 is three, fifteen coins are paid out. Likewise, when the total number of special symbols 189 is four, twenty coins are paid out. When the total number of special symbols 189 is five, twenty-five coins are paid out. When the total number of special symbols 189 is six, thirty coins are paid out. When the total number of special symbols 189 is seven, thirty-five coins are paid out. When the total number of special symbols 189 is eight, forty coins are paid out. When the total number of special symbols 189 is nine, forty-five coins are paid out. When the total number of special symbols 189 is ten, fifty coins are paid out. When the total number of special symbols 189 is eleven, fifty-five coins are paid out. When the total number of special symbols 189 is twelve, sixty coins are paid out. When the total number of special symbols 189 is thirteen, sixty-five coins are paid out. When the total number of special symbols 189 is fourteen, seventy coins are paid out. When the total number of special symbols 189 is fifteen, seventy-five coins are paid out.

[Answer Table]

Next, an answer table 134 will be described with reference to FIG. 18. The answer table 134 indicates an answer corresponding to a tentative word extracted by the conversation controller 91 ("keyword"). FIG. 18 shows an answer table.

In this embodiment, the answer table 134 is used in such a manner that, when the conversation controller 91 identifies a certain "keyword 135", an answer 136 or the like stored in association with the "keyword 135" is searched and extracted at high speed by checking memory contents of the answer table 134 stored in the conversation database 96.

The answer table 134 has a "keyword 135" against which a tentative word extracted by the sentence analysis unit 95 is checked (e.g., "start", "bonus", "payout", or the like). There are several kinds of answers 136 corresponding to the "keyword 135". Examples of the answer 136 are "WIN NEXT!", "THREE SUNS, AND YOU CAN GET BONUS GAME!", "FIVE HEARTS, AND YOU CAN GET FIVE TIMES!", and the like.

[Display State]

Figure 3:
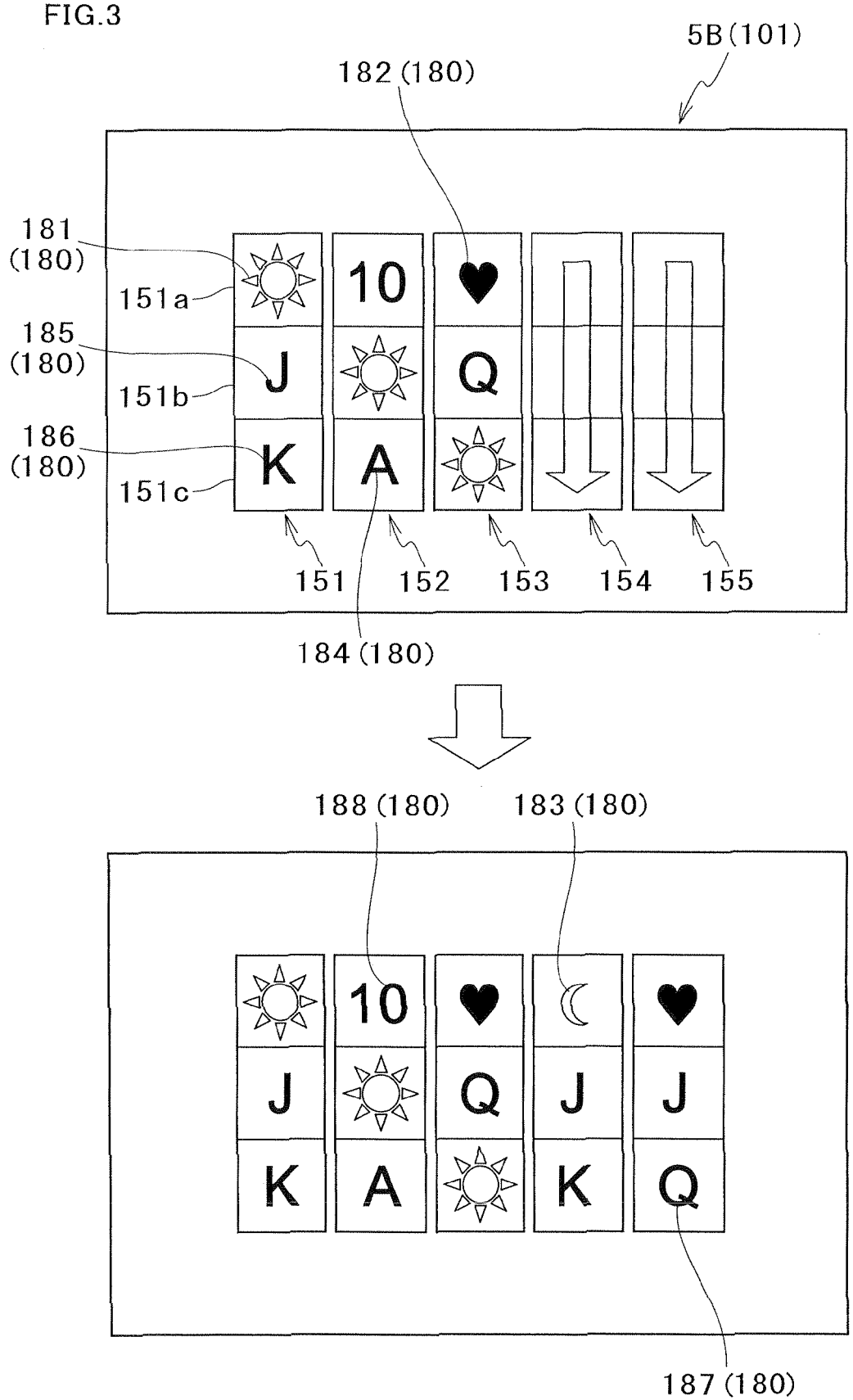
FIG. 3 is an explanatory view showing a display screen in a basic game.
Figure 4:
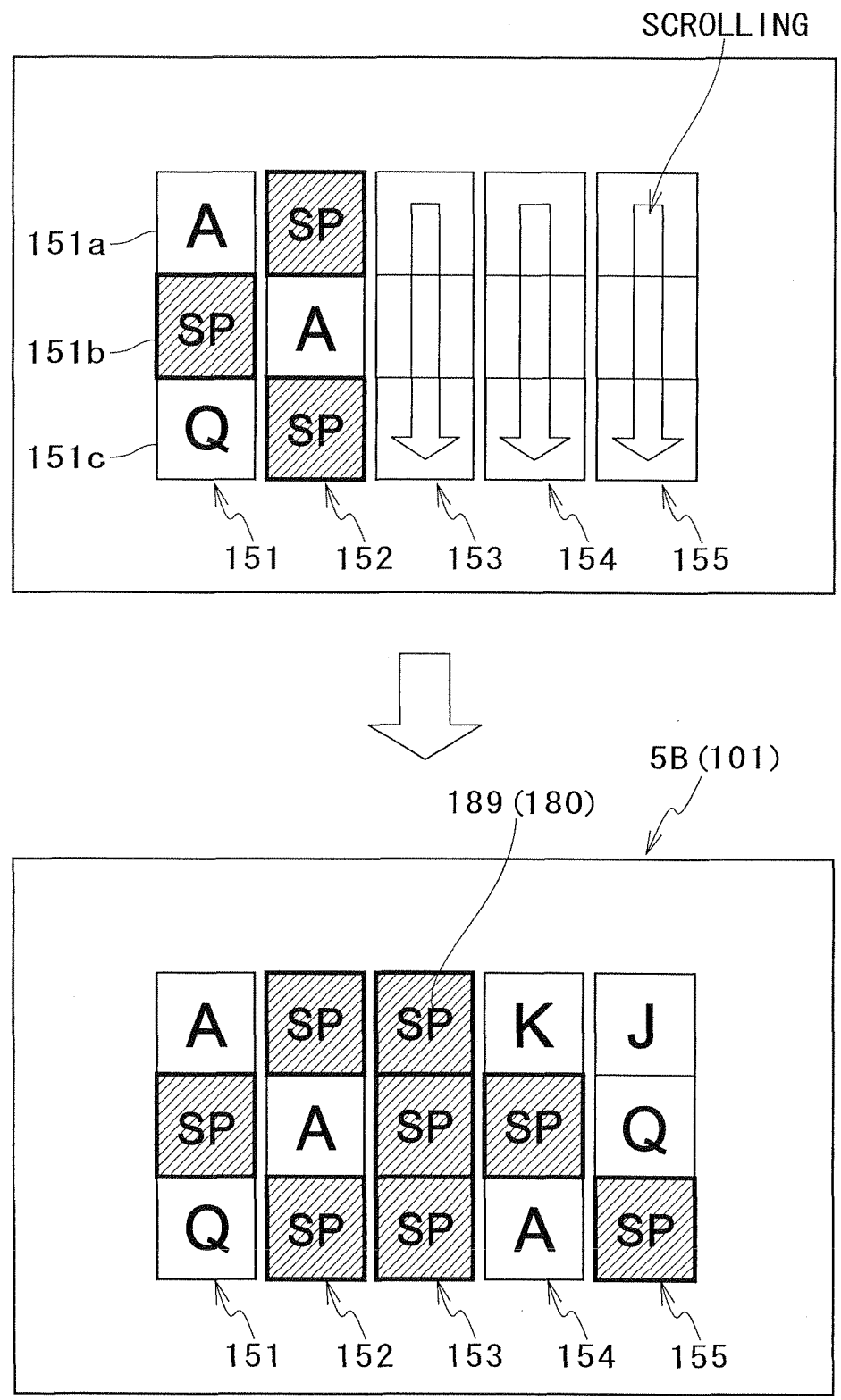
FIG. 4 is an explanatory view showing a display screen in a bonus game.

A specific description will be given to an example of display states of the central liquid crystal panel 5B which functions as the display 11 in an operation process of the above-described slot machine 1 and controlling method thereof. A description of the display state is based on such a structure that the central liquid crystal panel 5B arranges the symbols 180 by a video-reel system, as shown in FIGS. 3 and 4.

The central liquid crystal panel 5B has display windows 151 to 155 which arrange the symbols 180. The display windows 151 to 155 are disposed in a central part of the central liquid crystal panel 5B. A column of several symbols 180 is scrolled in the display windows 151 to 155 (see FIG. 3). The display windows 151 to 155 are divided into upper stages 151a, 152a, 153a, 154a, 155a, central stages 151b, 152b, 153b, 154b, 155b, and lower stages 151c, 152c, 153c, 154c, 155c. The symbols 180 are stopped (arranged) in the stages 151a to 155a, 151b to 155b, and 151c to 155c, respectively. For example, in FIG. 3, a "SUN" 181 is stopped in the upper stage 151a of the display window 151, a "SUN" 181 is stopped in the central stage 152b of the display window 152, and a "SUN" 181 is stopped in the lower stage 153c of the display window 153. Consequently, the display windows 151 to 155 display a symbol matrix as an arrangement area, which is made up of five columns and three rows. Here, the symbol matrix is not limited to the five-columns/three-rows one.

When, in a basic game (base game), a predetermined number of symbols 181 to 188 called scatter symbols are displayed on the central liquid crystal panel 5B as a winning combination, a payout giving process for paying out coins or the like is executed (see FIG. 9). For example, when three or more symbols of "SUN" 181, which is one of the scatter symbols, are rearranged (displayed) on the central liquid crystal panel 5B as shown in FIG. 3, the game is shifted to a bonus game, as a payout.

In this embodiment, the symbols 181 to 188 are set as the scatter symbols. However, the invention is not limited thereto. For example, only a particular symbol may be set as a scatter symbol. In addition, a scatter symbol may be chosen by a player. In addition, it may be possible to provide a payline L which horizontally traverses the central stages 151b to 155b of the respective display windows 151 to 155. When symbols stopped on the payline L constitute a predetermined combination, a process for paying out coins or the like may be performed. In other words, the payline L is for determining a combination of symbols 180. When symbols 180 are rearranged on and out of the payline L, a combination is determined for only the symbols 180 rearranged on the payline. When a winning combination is made as a result of determination of a combination, a process for paying out coins or the like may be performed based on the winning combination.

FIG. 4 shows a state where several symbols 180 are rearranged as a bonus game, when a relationship among several symbols 180 rearranged in the basic game (base game) shown in FIG. 3 includes a predetermined relationship (in this embodiment, when three symbols of "SUN" 181 are rearranged in the display windows 151 to 155). For example, FIG. 4 shows that a bonus game is executed so that symbols 180 are sequentially rearranged in the display windows 151 to 155. When all the symbols 180 are rearranged, eight symbols of "SP", which are special symbols 189 stopped in the display windows 151 to 155, are displayed. Then, in accordance with the bonus game payout table 133 shown in FIG. 11, forty coins are paid out as a payout.

[Symbol, Combination, and the Like]

Symbols 180 to be displayed in the display windows 151 to 155 of the central liquid crystal panel 5B constitute columns of twenty-two symbols, though not shown. Each of symbols constituting each column is given any one of code numbers 0 to 21. Each of the symbol columns is a combination of picture symbols "SUN" 181, "HEART" 182, and "MOON" 183, character symbols "A" 184, "J" 185, "K" 186, "Q" 187 and "10" 188.

Three successive symbols in the symbol columns are displayed (arranged) in the upper stages 151a, 152a, 153a, 154a, 155a, the center stages 151b, 152b, 153b, 154b, 155b and the lower stages 151c, 152c, 153c, 154c, 155c of the display windows 151 to 155, respectively, to form a symbol matrix of five columns and three rows in the display windows 151 to 155. When a BET button is pushed and then a start button is pushed to start a game, the symbols forming the symbol matrix are scrolled. When a predetermined period of time has elapsed after scroll is started, the scroll of each symbol is stopped (rearranged).

The symbols 181 to 188 are set as scatter symbols. Scatter symbols are such symbols that a player is put in an advantageous position when a predetermined number or more of them are displayed in the display windows 151 to 155. The advantageous position is a state where coins corresponding to the scatter symbols are paid out, a state where the number of coins to be paid out is added to a credit, a state where a bonus game is started, or the like.

For example, when three or more symbols of "SUN" 181 are rearranged in the display windows 151 to 155, a bonus game is triggered and a gaming state is shifted from a base game (basic game) to a bonus game. When five or more symbols of "MOON" 183 are stopped in the display windows 151 to 155, thirty coins (game media) per bet are paid out.

The bonus game is a gaming state which is more advantageous than a base game. In this embodiment, the bonus game is a free game. The free game is a game allowing a player to play a game a predetermined number of times without betting a coin. No particular limitation is put on the bonus game, as long as it is a gaming state advantageous to the player, that is, it is more advantageous than the basic game. For example, the bonus game may include a state where more game media are obtainable than in the basic game, a state where a game medium is obtainable with higher probability than in the basic game, a state where a game medium is less consumed than in the basic game, and the like. Specifically, a free game, a second game, a feature game, and the like may be mentioned as examples of the bonus game.

[Processing Operation of Slot Machine 1 (1A, 1B): Main Control Board 71]

Next, a process executed in the main control board 71 of the slot machine 1 (1A, 1B) will be described. As the main CPU 32 reads out and executes a game program stored in the ROM 34, a game is progressed. In the following description, as shown in FIG. 1, the slot machine 1 operated by a player 200A will be referred to as a slot machine 1A, and the slot machine 1 disposed neighboring the slot machine 1A will be referred to as a slot machine 1B (which is operated by a player 200B).

[First Game Execution Process]

Figure 12:
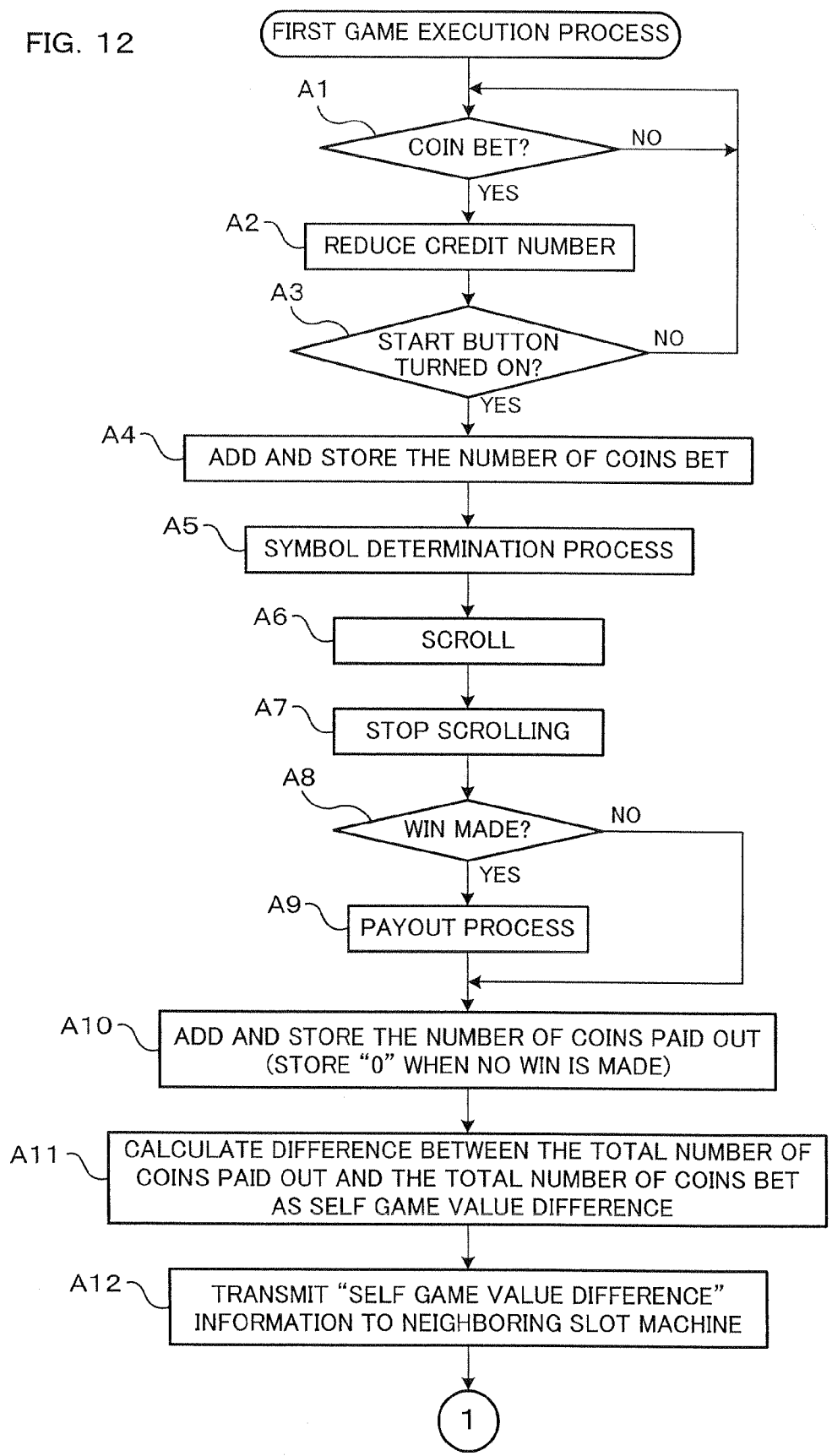
FIG. 12 is a flowchart showing a first game execution process which is executed in the slot machine.
Figure 13:
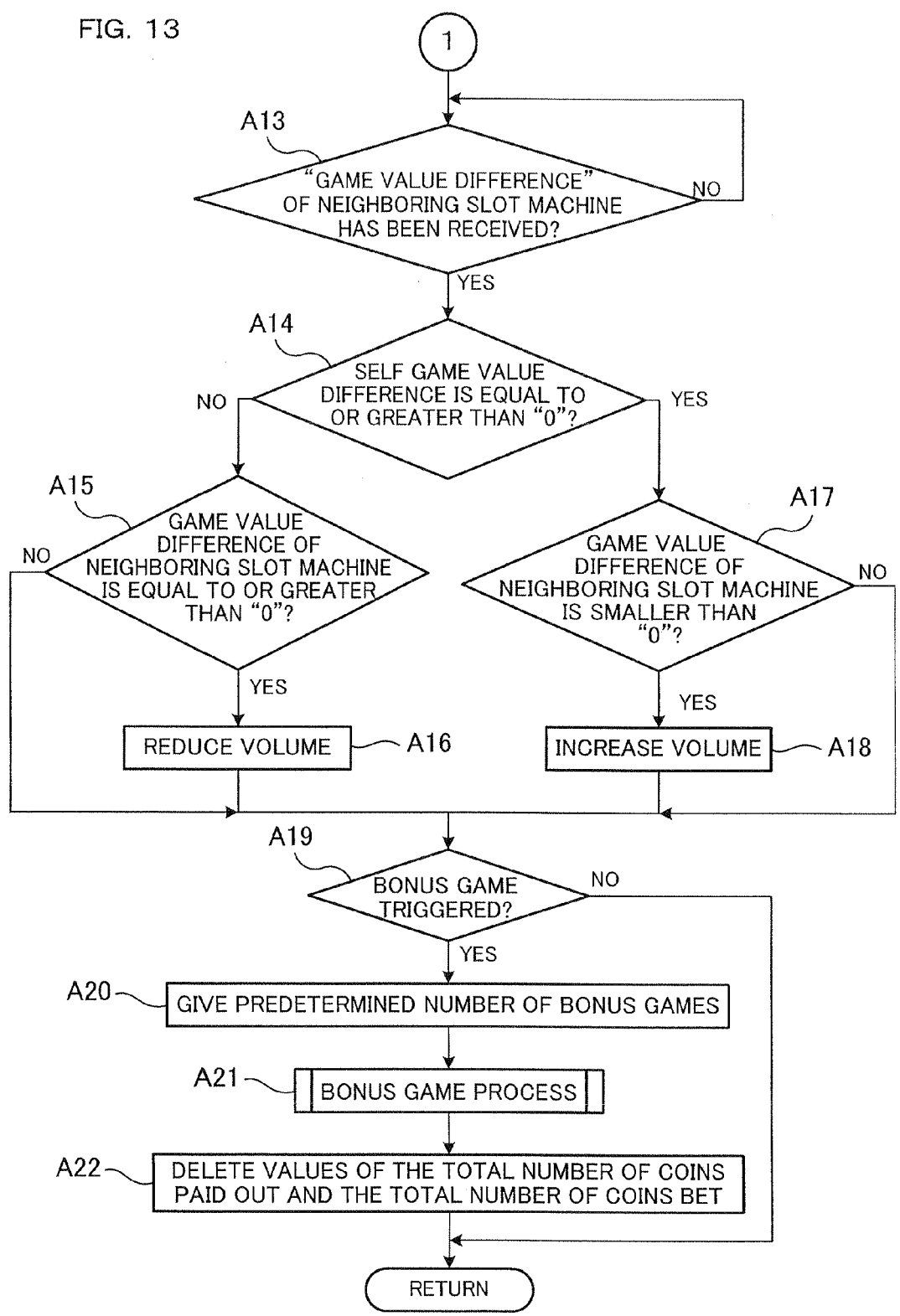
FIG. 13 is a flowchart showing the first game execution process which is executed in the slot machine.

The main CPU 32 of the slot machine 1A executes a first game execution process shown in FIGS. 12 and 13. When the first game execution process is executed, first, the main CPU 32 determines whether a coin has been bet or not (A1). In this process, whether an input signal resulting from a push of the bet button has been received or not is determined. When it is determined that a coin has not been bet (A1: NO), the step A1 is re-executed, so that the CPU waits until a coin is bet.

On the other hand, when it is determined that a coin has been bet (A1: YES), the credit number stored in the RAM 33 is reduced in accordance with the number of coins bet (A2). When the number of coins bet is greater than the credit number stored in the RAM 33, the step A2 is re-executed without reducing the credit number. When the number of coins bet exceeds an upper limit (in this embodiment, 50 pieces) bettable in a single game, the step A3 is executed without reducing the credit number.

Then, whether a start button has been turned on or not is determined (A3). When it is determined that the start button has not been turned on (A3: NO), the process is returned to A1. Here, in a case where the start button has not been turned on (for example, the start button is not turned on but a command to end the game is inputted), a result of reduction in A2 is cancelled.

On the other hand, when it is determined that the start button has been turned on (A3: YES), the number of coins bet is added and stored in the RAM 33 (A4). Subsequently, a symbol determination process is executed (A5). That is, a stop symbol determination program is executed based on the base game winning combination lottery table 130 stored in the RAM 33, to thereby determine a symbol matrix including fifteen symbols 180 to be stopped.

Then, the symbols 180 in the display windows 151 to 155 are scrolled (A6) When a predetermined period of time (base time) has elapsed after the scroll of the symbols 180 is started, the symbol matrix determined in A5 is stopped (rearranged) in the display windows 151 to 155 (A7).

Then, whether a win is made or not, that is, whether a combination of symbols 180 stopped in the display windows 151 to 155 is a winning combination or not, is determined (A8). When it is determined that the combination is not a winning combination (which makes a win) (A8: NO), the process goes to A10. When it is determined that the combination is a winning combination (A8: YES), a payout process is executed (A9). More specifically, the number of coins to be paid out based on the winning combination which is a winning combination shown in FIG. 9 is calculated. When the coins to be paid out are reserved, a predetermined number of credits are added to the credit number stored in the RAM 33. When the coins are paid out, a control signal is transmitted to the hopper 64 so that a predetermined number of coins are paid out to the coin receiving tray 19.

Then, the number of coins paid out in A9 is added and stored in the RAM 33 (A10). When it has been determined in A8 that the combination is not a winning combination (which makes a win), the number of coins is set to be "0", which is added and stored. Then, a difference between the total number of coins paid out which has been added and stored in A10 and the total number of coins bet which has been added and stored in A4 is calculated as a "self game value difference" (A11).

Then, in the slot machine 1A, information of the "self game value difference" calculated in A11 is transmitted from the transmitter 88 to the neighboring slot machine 1B (A12).

Then, as shown in FIG. 13, whether the receiver 87 has received from the neighboring slot machine 1B information of a "game value difference" calculated in the slot machine 1B or not is determined (A13). When it is determined that the information has not been received (A13: NO), the step A13 is re-executed so that a reception standby state occurs.

When it is determined that the information has been received (A13: YES), then whether the "self game value difference" calculated in A11 is equal to or greater than "0", or not is determined (A14). When it is determined that the "self game value difference" is not equal to or greater than "0" (A14: NO), then whether the "game value difference" calculated in the slot machine 1B, which has been received in A13, is equal to or greater than "0", or not is determined (A15). When it is determined that the "game value difference" calculated in the slot machine 1B is not equal to or greater than "0" (A15: NO), the process proceeds to A19. On the other hand, when the "game value difference" calculated in the slot machine 1B is equal to or greater than "0" (A15: YES), the sub CPU 74 sets the sound source IC 78 so as to output a voice at reduced volume corresponding to the "self game value difference" (A16).

When it is determined in A14 that the "self game value difference" is equal to or greater than "0" (A14: YES), then whether the "game value difference" calculated in the slot machine 1B, which has been received in A13, is smaller than "0", or not is determined (A17) When the "game value difference" calculated in the slot machine 1B is not smaller than "0" (A17: NO), the process proceeds to A19. When the "game value difference" calculated in the slot machine 1B is smaller than "0" (A17: YES), the sub CPU 74 sets the sound source IC 78 so as to output a voice at increased volume corresponding to the "self game value difference" (A18).

Then, whether a bonus game trigger is made as a winning combination or not is determined (A19). In other words, whether three or more symbols of "SUN" 181 are arranged in the display windows 151 to 155 or not is determined. When it is determined that a bonus game trigger is not made (A19: NO), this process ends. When it is determined that a bonus game trigger is made (A19: YES), a game state is shifted from a base game (basic game) to a bonus game. In other words, a bonus game which allows a game to be performed a predetermined number of times (in this embodiment, ten times) without betting a coin is awarded (A20). Then, a bonus game process is executed (A21). The bonus game process will be described later.

Then, after the bonus game process A21 ends, the total number of coins bet which has been added and stored in the RAM 33 in A4 and the total number of coins paid out which has been added and stored in the RAM 33 in A10 are deleted and set to be "0" (A22). Then, this process once ends.

In this embodiment, after the bonus game process A21 ends, the total number of coins bet which has been added and stored in the RAM 33 in A4 and the total number of coins paid out which has been added and stored in the RAM 33 in A10 are deleted and set to be "0". However, a condition for performing this deleting step may be a predetermined button input, completion of a predetermined number of unit games, or elapse of a predetermined period of time.

In such a case, when the predetermined condition is satisfied, the number of game values given and the number of game values consumed, which have been stored in the RAM 33, can be deleted. As a result, player's win or lose of the game can be once reset.

[Bonus Game Process]

Figure 14:
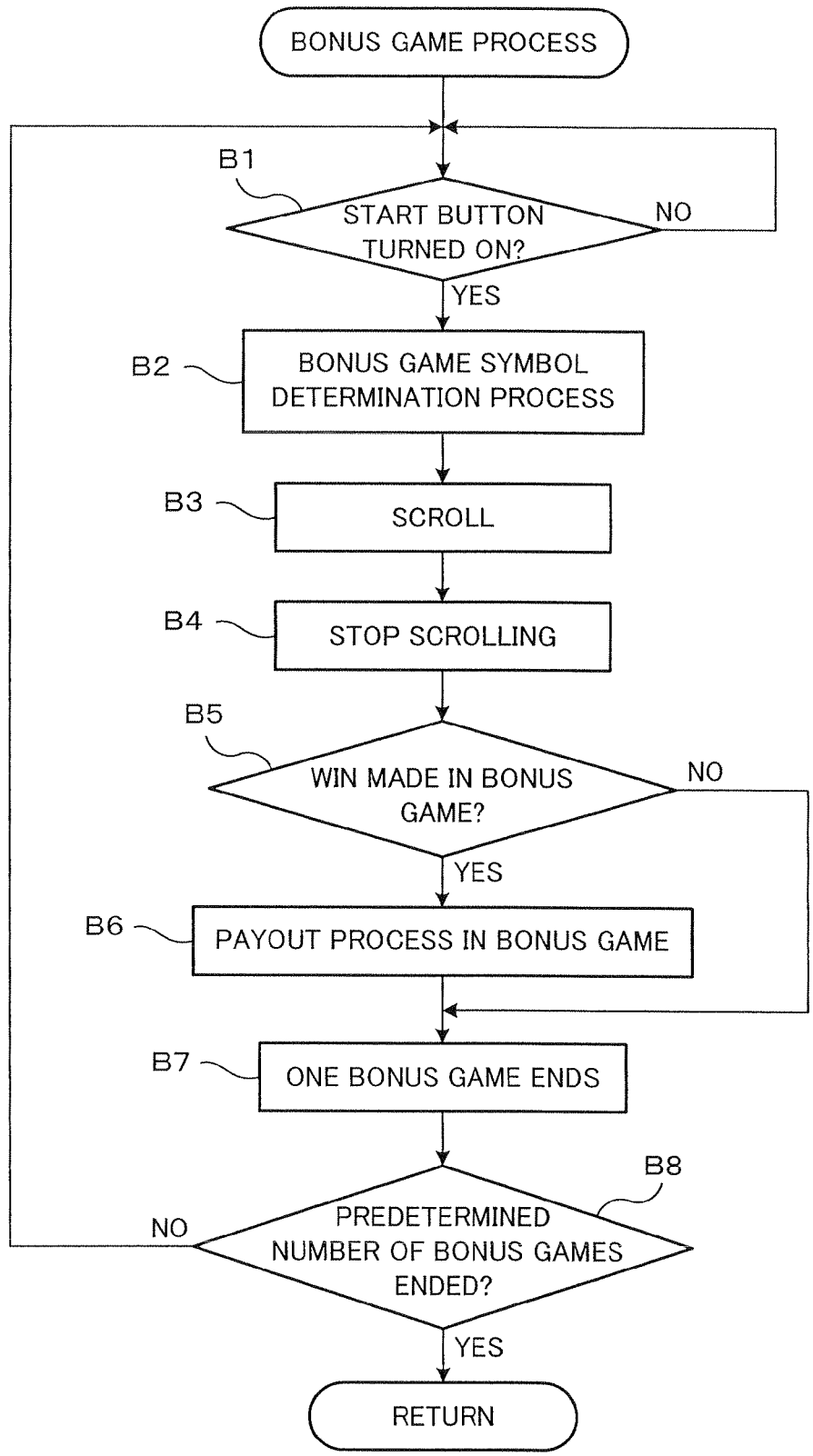
FIG. 14 is a flowchart showing a bonus game process which is executed in the slot machine.

When it has been determined in A19 of FIG. 13 that a bonus game trigger is made, the main CPU 32 of the slot machine 1 executes, in A21, a bonus game process shown in FIG. 14. The bonus game processing program is stored in the ROM 34.

When the bonus game process is executed, first, whether a start button has been turned on or not is determined (B1). When it is determined that a start button has not been turned on (B1: NO), the process is returned to B1.

When it is determined that a start button has been turned on (B1: YES), a bonus game symbol determination process is executed (B2). That is, a bonus game stop symbol determination program is executed based on the bonus game winning combination lottery table 132 stored in the RAM 33, thereby determining a symbol matrix including fifteen symbols 180 to be stopped.

Then, the symbols 180 in the display windows 151 to 155 are scrolled (B3). When a predetermined period of time (base time) has elapsed after the scroll of the symbols 180 is started, the symbol matrix determined in B2 is stopped (rearranged) in the display windows 151 to 155 (B4).

Subsequently, whether a win is made in the bonus game or not, that is, whether the symbol matrix stopped includes a special symbol 189 or not, is determined (B5). When it is determined that there is no special symbol 189 (B5: NO), the process goes to B7. When it is determined that there is a special symbol 189 (B5: YES), a payout process is executed (B6). In the payout process, coins corresponding to the number of special symbols 189 displayed in the display windows 151 to 155 are paid out based on the bonus game payout table 133. That is, as shown in FIG. 11, the number of coins to be paid out is calculated based on the number of special symbols 189. When the coins to be paid out are reserved, a predetermined number of credits are added to the credit number stored in the RAM 33. When the coins are paid out, a control signal is transmitted to the hopper 64 so that a predetermined number of coins are paid out to the coin receiving tray 19. Here, one bonus game ends (B7). This means an end of one of the predetermined number of bonus games (ten bonus games in this embodiment), which have been given in A20 of the first game execution process shown in FIG. 13.

Then, whether the predetermined number of bonus games (ten bonus games in this embodiment), which have been given in A20 of the first game execution process shown in FIG. 13, have ended or not is determined (B8). More specifically, whether ten bonus games have been executed or not is determined. When it is determined that the predetermined number of bonus games have not ended (B8: NO), the process is returned to B1. When it is determined that the predetermined number of bonus games have ended (B8: YES), this routine ends.

[Processing Operation of Slot Machine 1 (1A, 1B): Sub Control Board 72]

When various processes are executed by the first game execution process in the main control board 71, a result or contents corresponding to the process is/are inputted as a command or data to the sub control board 72. The sub control board 72 performs displays of the payout-number display unit 8 and the credit-number display unit 9 and the like of the central liquid crystal panel 5B, and displays an effect image on the upper liquid crystal panel 5A. In addition, the sub control board 72 presents an effect by a sound output from the speaker 23, dependently on or independently from the effect made on the upper liquid crystal panel 5A. In this embodiment, moreover, a first conversation process which will be described below is executed in accordance with a voice input through the microphone 90.

[First Conversation Process]

Figure 15:
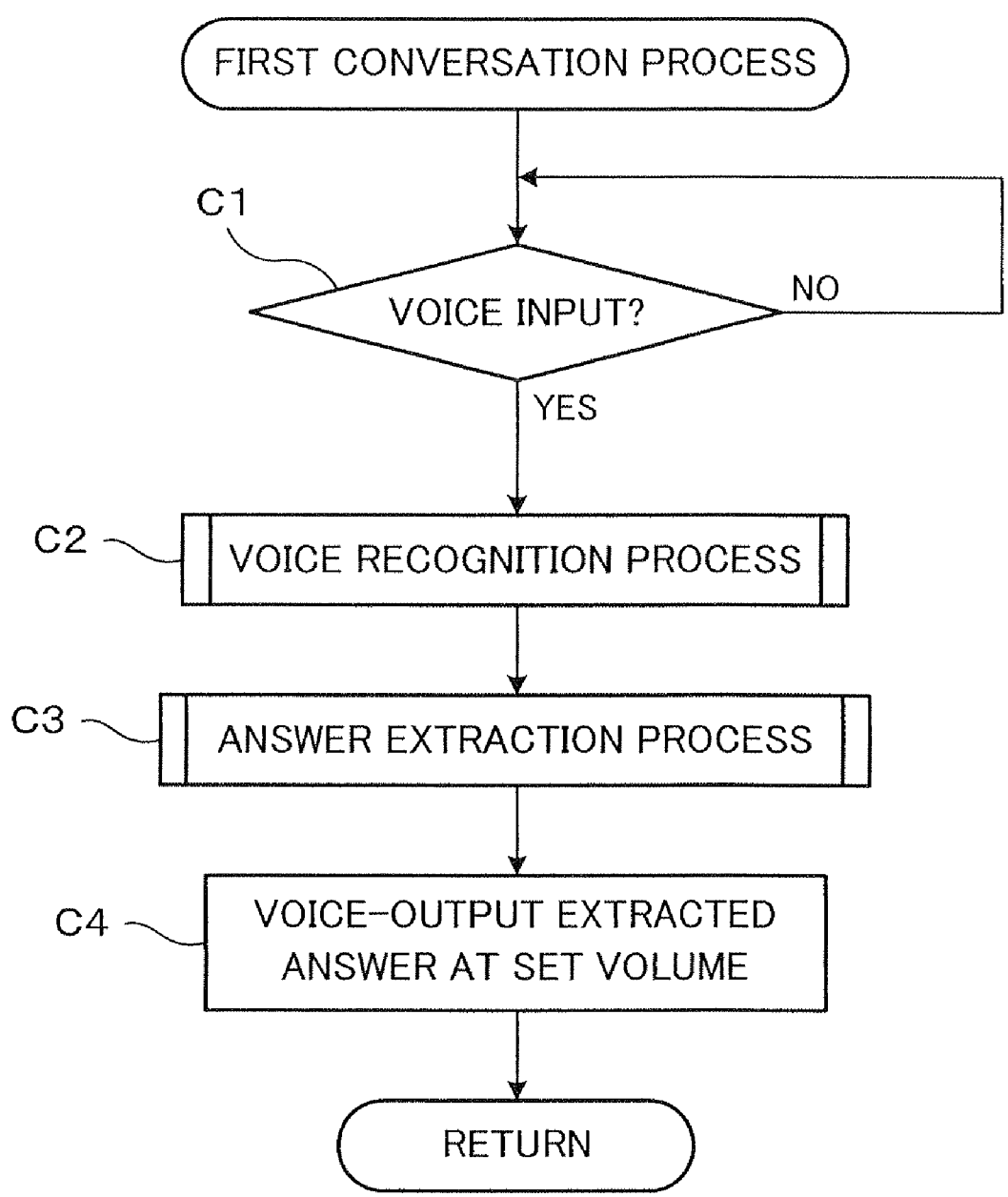
FIG. 15 is a flowchart showing a first conversation process which is executed in the slot machine.

A first conversation process will be described with reference to FIG. 15. FIG. 15 is a flowchart showing a first conversation process. The process is implemented by the sub CPU 74 reading out and executing a first conversation processing program which is stored in the program ROM 75.

When the first conversation process is executed, first, the sub CPU 74 determines whether a voice signal has been inputted from the microphone 90 or not (C1). When it is determined that a voice signal has not been inputted (C1: NO), the step C1 is re-executed so that a standby state continues until a voice signal is inputted.

Subsequently, a later-described voice recognition process is executed (C2). In this process, a voice signal is converted into a character string signal, and outputted. Then, a later-described answer extraction process is executed (C3). In this process, an answer guessed from the character string signal is extracted. The answer thus extracted is voice-outputted from the speaker 23 at volume set in A16 or A18 of the first game execution process (C4). Here, the first conversation process once ends.

[Voice Recognition Process]

Figure 16:
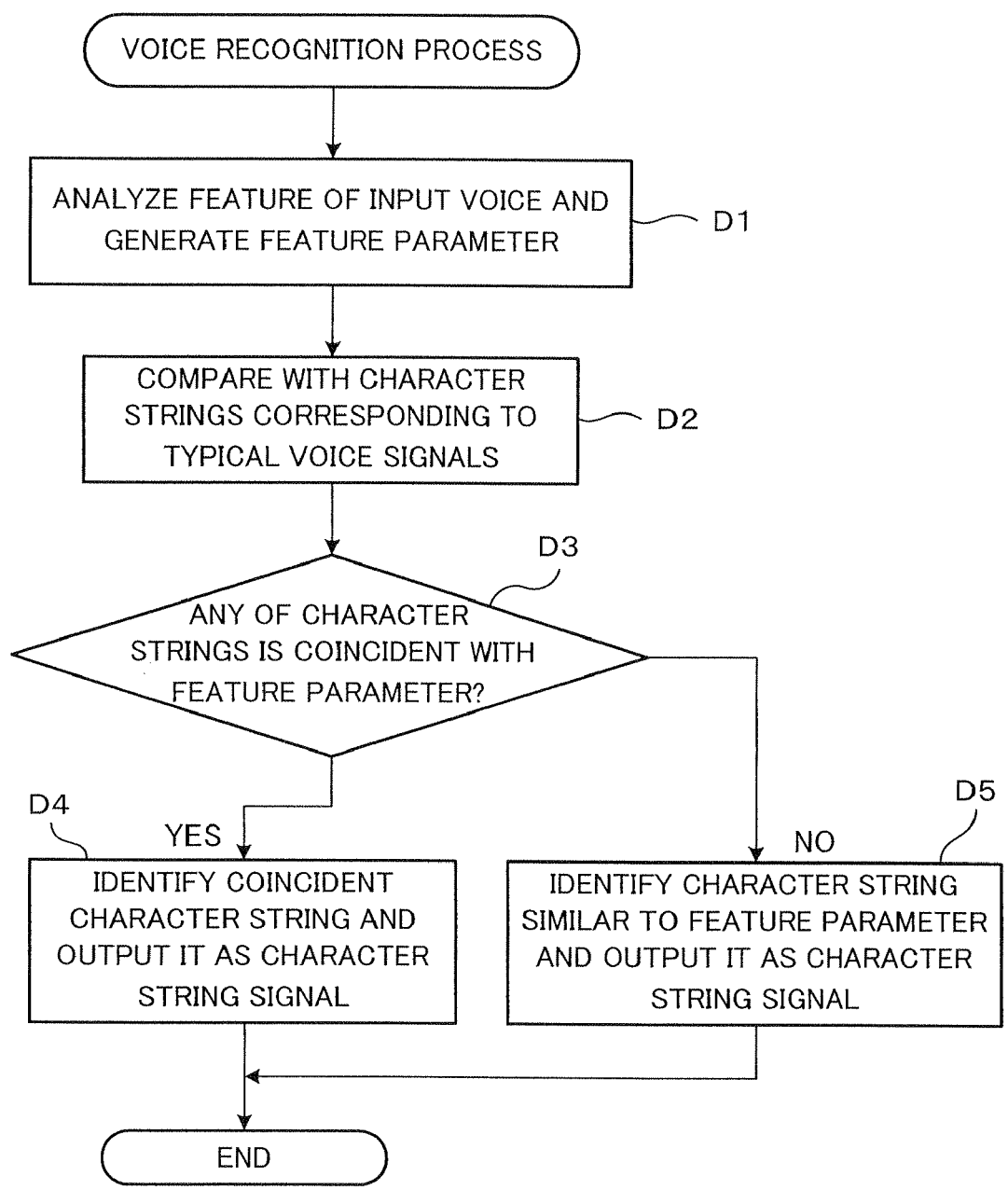
FIG. 16 is a flowchart showing a voice recognition process which is executed in the conversation process.

Next, a voice recognition process will be described with reference to FIG. 16. FIG. 16 is a flowchart showing a voice recognition process. The voice recognition process is a process executed in C2 of the above-described first conversation process.

When a voice signal is received from the microphone 90, the voice recognition unit 93 analyzes features of the inputted voice, and generates a feature parameter (D1). Then, the voice recognition unit 93 compares the feature parameter with character strings corresponding to typical voice signals which have been stored in the voice recognition dictionary memory unit 94 (D2). Then, the voice recognition unit 93 determines whether any of the compared character strings is coincident with the feature parameter or not (D3). When there is a coincident one (D3: YES), the voice recognition unit 93 identifies the coincident character string, and outputs it as a character string signal to the conversation control CPU 92 (D4). When there is no coincident one (D3: NO), the voice recognition unit 93 identifies a character string similar to the analyzed feature parameter, and outputs it as a character string signal (D5).

[Answer Extraction Process]

Figure 17:
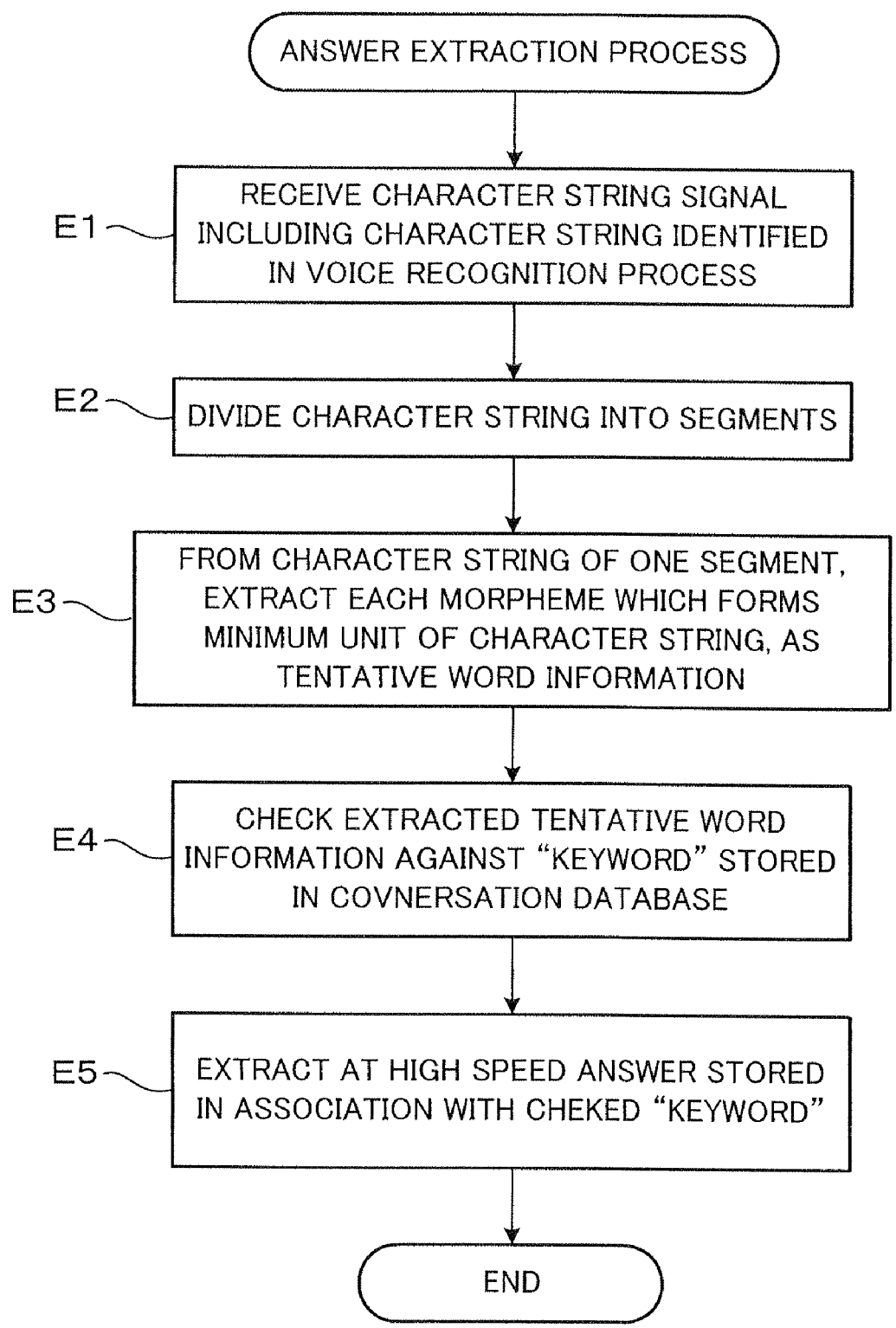
FIG. 17 is a flowchart showing an answer extraction process which is executed in the conversation process.

Next, an answer extraction process will be described with reference to FIG. 17. FIG. 17 is a flowchart showing an answer extraction process of this embodiment. The answer extraction process is a process executed in C3 of the above-described first conversation process.

First, the sentence analysis unit 95 receives a character string signal including a character string identified in the voice recognition process (E1). Then, the sentence analysis unit 95 analyzes a character string included in the character string signal received. To be more specific, first, the sentence analysis unit 95 divides the character string identified in the voice recognition process, into segments (E2). Based on a character string of one segment thus divided, the sentence analysis unit 95 extracts each morpheme which forms a minimum unit of the character string, from the character string of the one segment, as tentative word information (E3).

Then, the tentative word information thus extracted is checked against the "keywords" stored in the conversation database 96 (E4). When a "keyword" is identified as a result of checking, an answer or the like shown in FIG. 18 which is stored in association with the "keyword" is searched and extracted at high speed, based on the answer table 134 shown in FIG. 18 (E5). More specifically, when the extracted tentative word is identified as a keyword "end", an answer 136 to be extracted is "MAKE UP NEXT TIME!".

In the above-described structure, when the self game value difference is smaller than "0" while the someone's game value difference is equal to or greater than "0", an answer 136 can be voice-outputted at reduced volume from the speaker 23 in response to a voice input through the microphone 90. When the self game value difference is equal to or greater than "0" while the someone's game value difference is smaller than "0", an answer 136 can be voice-outputted at increased volume from the speaker 23 in response to a voice input through the microphone 90. For example, when a player is winning a game and a neighboring player is losing a game, the slot machine 1 can voice-output an answer 136 at increased volume from the speaker 23 in response to a voice input, while when a player is losing a game and a neighboring player is winning a game, the slot machine 1 can voice-output an answer 136 at reduced volume from the speaker 23 in response to a voice input. As a result, the slot machine 1 can voice-output an answer 136 at volume considering win or lose of the neighboring player. This may allow the player to continue the game without being offended.

When the predetermined condition is satisfied, the number of game values given and the number of game values consumed, which have been stored in the RAM 33, can be deleted. As a result, player's win or lose of the game can be once reset.

Second Embodiment

Figure 19:
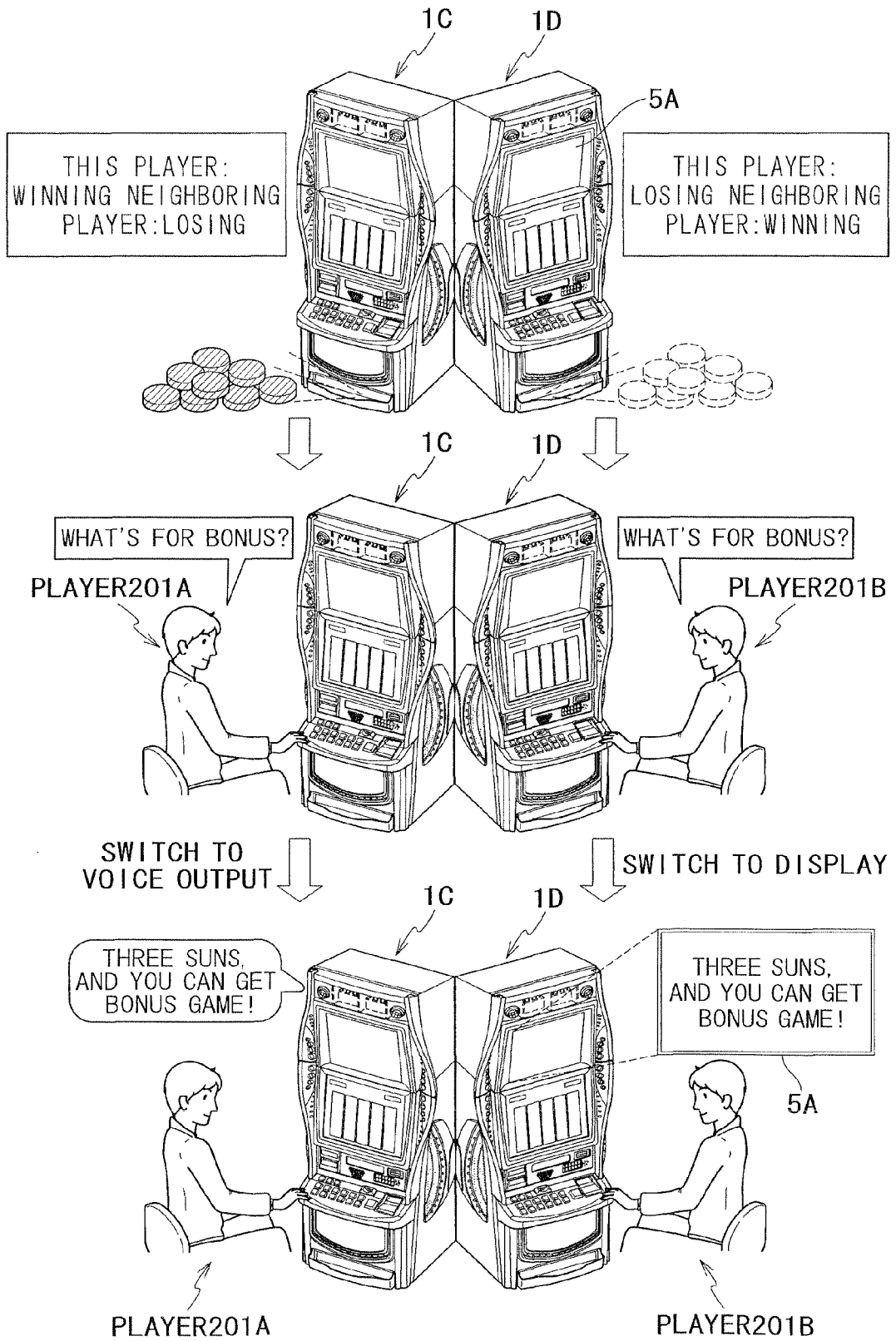
FIG. 19 is an explanatory view showing a method of operating a slot machine according to a second embodiment.
Figure 20:
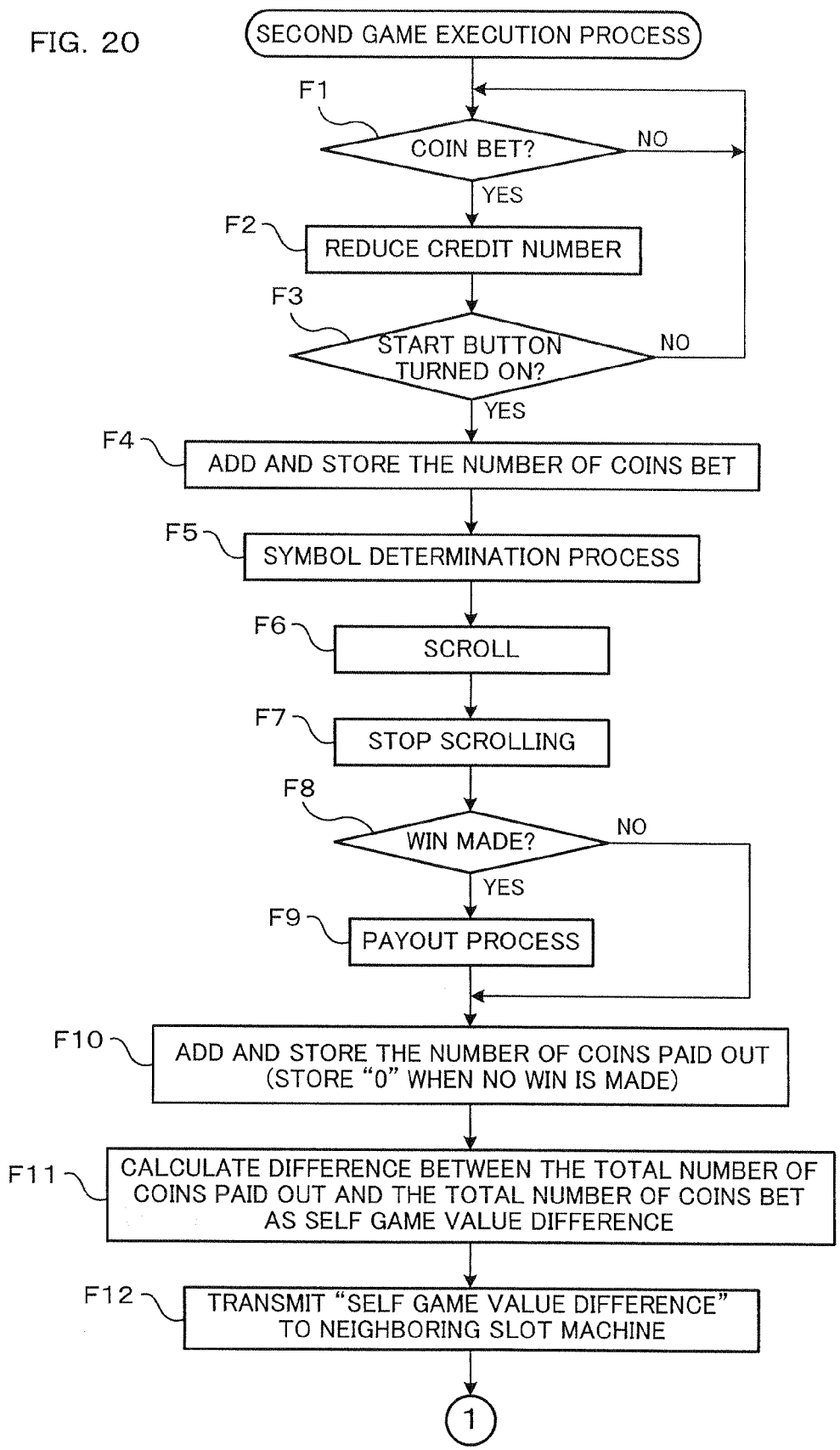
FIG. 20 is a flowchart showing a second game execution process which is executed in the slot machine.
Figure 21:
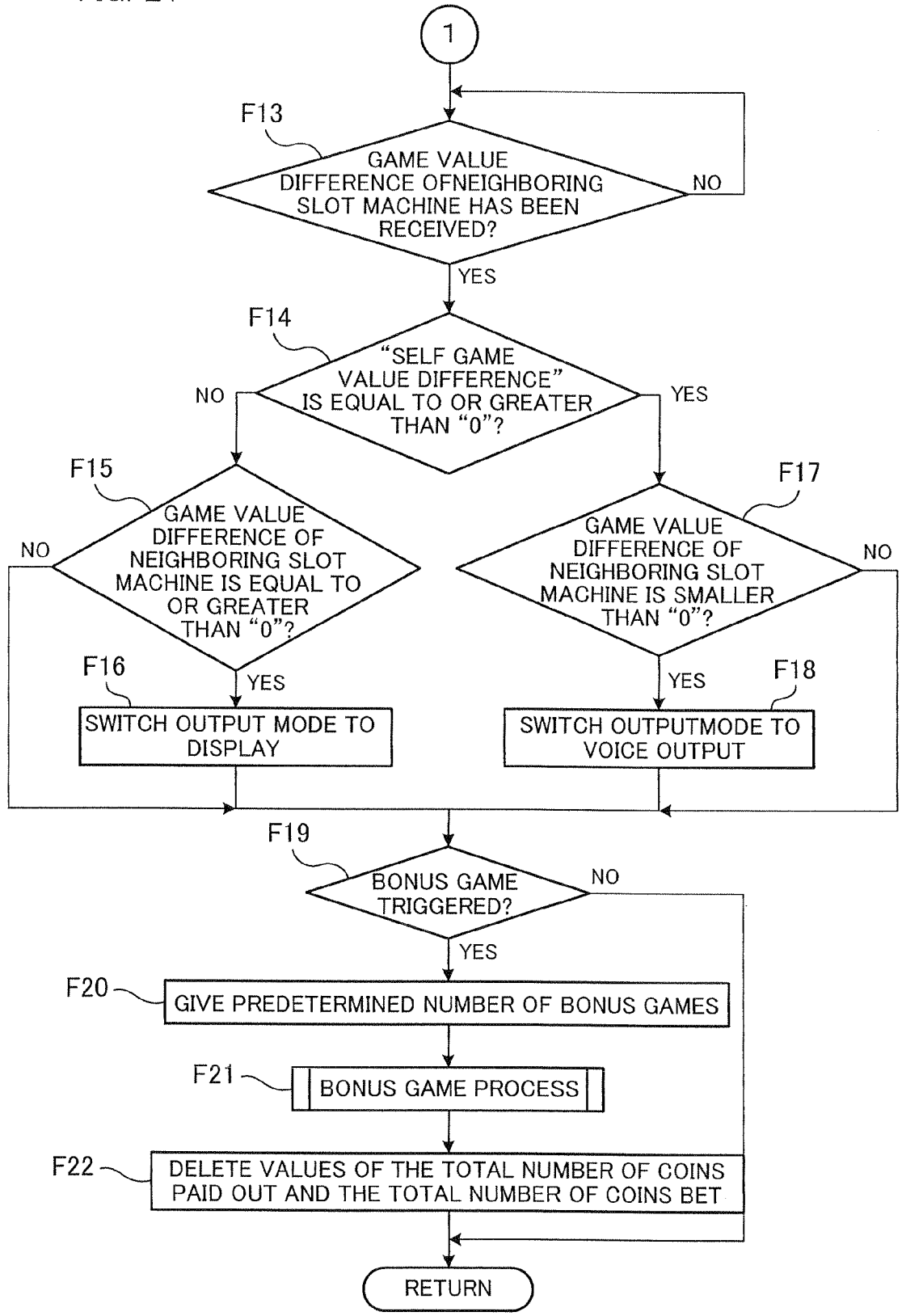
FIG. 21 is a flowchart showing the second game execution process which is executed in the slot machine.
Figure 22:
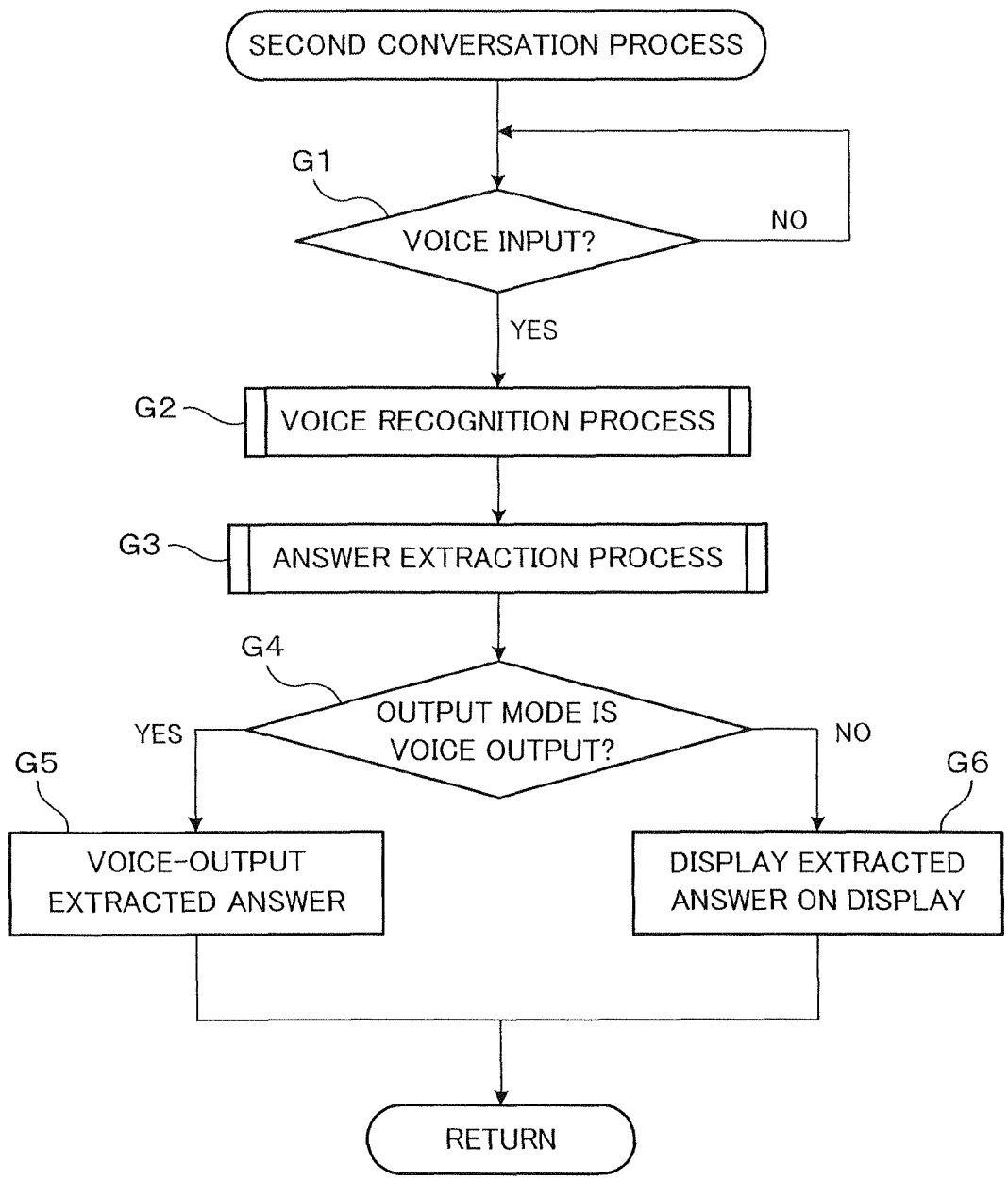
FIG. 22 is a flowchart showing a second conversation process which is executed in the slot machine.

A slot machine 1 (1C, 1D) according to a second embodiment of the present invention will be described with reference to FIGS. 19 to 22. FIGS. 20 and 21 are a flowchart explaining a second game execution process executed by the slot machine 1C of the second embodiment. FIG. 22 is a flowchart showing a second conversation process executed by the slot machine 1C of the second embodiment. The slot machine 1C of the second embodiment and the slot machine 1 (1A, 1B) of the first embodiment have substantially the same structure and operation, except for the first game execution process and the first conversation process. The same structure and operation will be denoted by the same reference numerals, without specific descriptions thereof.

[Processing Operation of Slot Machine 1 (1C, 1D): Main Control Board 71]

A second game execution process which is executed by the slot machine 1 (1C, 1D) of the second embodiment will be described with reference to the flowchart shown in FIGS. 20 and 21. In the second game execution process, as the main CPU 32 reads out and executes a program stored in the ROM 34, a game is progressed. In the following description, as shown in FIG. 19, the slot machine 1 operated by a player 201A will be referred to as a slot machine 1C, and the slot machine 1 disposed neighboring the slot machine 1C will be referred to as a slot machine 1D (which is operated by a player 201B).

[Second Game Execution Process]

The main CPU 32 of the slot machine 1C executes a second game execution process shown in FIGS. 20 and 21. When the second game execution process is executed, first, the main CPU 32 determines whether a coin has been bet or not (F1). In this process, whether an input signal resulting from a push of the bet button has been received or not is determined. When it is determined that a coin has not been bet (F1: NO), the step F1 is re-executed, so that the CPU waits until a coin is bet.

On the other hand, when it is determined that a coin has been bet (F1: YES), the credit number stored in the RAM 33 is reduced in accordance with the number of coins bet (F2). When the number of coins bet is greater than the credit number stored in the RAM 33, the step F2 is re-executed without reducing the credit number. When the number of coins bet exceeds an upper limit (in this embodiment, 50 pieces) bettable in a single game, the step F3 is executed without reducing the credit number.

Then, whether a start button has been turned on or not is determined (F3). When it is determined that the start button has not been turned on (F3: NO), the process is returned to F1. Here, in a case where the start button has not been turned on (for example, the start button is not turned on but a command to end the game is inputted), a result of reduction in F2 is cancelled.

On the other hand, when it is determined that the start button has been turned on (F3: YES), the number of coins bet is added and stored in the RAM 33 (F4). Subsequently, a symbol determination process is executed (F5). That is, a stop symbol determination program is executed based on the base game winning combination lottery table 130 stored in the RAM 33, to thereby determine a symbol matrix including fifteen symbols 180 to be stopped.

Then, the symbols 180 in the display windows 151 to 155 are scrolled (F6). When a predetermined period of time (base time) has elapsed after the scroll of the symbols 180 is started, the symbol matrix determined in F5 is stopped (rearranged) in the display windows 151 to 155 (F7).

Then, whether a win is made or not, that is, whether a combination of symbols 180 stopped in the display windows 151 to 155 is a winning combination or not, is determined (F8). When it is determined that the combination is not a winning combination (which makes a win) (F8: NO), the process goes to F10. When it is determined that the combination is a winning combination (F8: YES), a payout process is executed (F9). More specifically, the number of coins to be paid out based on the winning combination which is a winning combination shown in FIG. 9 is calculated. When the coins to be paid out is reserved, a predetermined number of credits are added to the credit number stored in the RAM 33. When the coins are paid out, a control signal is transmitted to the hopper 64 so that a predetermined number of coins are paid out to the coin receiving tray 19.

Then, the number of coins paid out in F9 is added and stored in the RAM 33 (F10). When it has been determined in F8 that the combination is not a winning combination (which makes a win), the number of coins is set to be "0", which is added and stored. Then, a difference between the total number of coins paid out which has been added and stored in F10 and the total number of coins bet which has been added and stored in F4 is calculated as a "self game value difference" (F11).

Then, in the slot machine 1C, information of the "self game value difference" calculated in F11 is transmitted from the transmitter 88 to the neighboring slot machine 1D (F12).

Then, as shown in FIG. 21, whether the receiver 87 has received from the neighboring slot machine 1D information of a "game value difference" calculated in the slot machine 1D or not is determined (F13). When it is determined that the information has not been received (F13: NO), the step F13 is re-executed so that a reception standby state occurs.

When it is determined that the information has been received (F13: YES), then whether the "self game value difference" calculated in F11 is equal to or greater than "0", or not is determined (F14). When it is determined that the "self game value difference" is not equal to or greater than "0" (F14: NO), then whether the "game value difference" calculated in the slot machine 1D, which has been received in F13, is equal to or greater than "0", or not is determined (F15). When it is determined that the "game value difference" calculated in the slot machine 1D is not equal to or greater than "0" (F15: NO), the process proceeds to F19. On the other hand, when the "game value difference" calculated in the slot machine 1D is equal to or greater than "0" (F15: YES), the sub CPU 74 sets a medium for outputting to outside an answer 136 which is outputted by the conversation controller 91, to be the central liquid crystal panel 5B (F16). That is, in a later-described second conversation process, the answer 136 is outputted in the form of a displayed image (see FIG. 19).

When it is determined in F14 that the "self game value difference" is equal to or greater than "0" (F14: YES), then whether the "game value difference" calculated in the slot machine 1D, which has been received in F13, is smaller than "0", or not is determined (F17). When the "game value difference" calculated in the slot machine 1D is not smaller than "0" (F17: NO), the process proceeds to F19. When the "game value difference" calculated in the slot machine 1D is smaller than "0" (F17: YES), the sub CPU 74 sets a medium for outputting to outside an answer 136 which is outputted by the conversation controller 91, to be the speaker 23 (F18). That is, in a later-described second conversation process, the answer 136 is outputted in the form of voice (see FIG. 19).

Then, whether a bonus game trigger is made as a winning combination or not is determined (F19). In other words, whether three or more symbols of "SUN" 181 are arranged in the display windows 151 to 155 or not is determined. When it is determined that a bonus game trigger is not made (F19: NO), this process ends. When it is determined that a bonus game trigger is made (F19: YES), a game state is shifted from a base game (basic game) to a bonus game. In other words, a bonus game which allows a game to be performed a predetermined number of times (in this embodiment, ten times) without betting a coin is awarded (F20). Then, a bonus game process is executed (F21). Since the bonus game process is the same as in the first embodiment, a description thereof will be omitted.

Then, after the bonus game process F21 ends, the total number of coins bet which has been added and stored in the RAM 33 in F4 and the total number of coins paid out which has been added and stored in the RAM 33 in F10 are deleted and set to be "0" (F22). Then, this process once ends.

In this embodiment, after the bonus game process F21 ends, the total number of coins bet which has been added and stored in the RAM 33 in F4 and the total number of coins paid out which has been added and stored in the RAM 33 in F10 are deleted and set to be "0". However, a condition for performing this deleting step may be a predetermined button input, completion of a predetermined number of unit games, or elapse of a predetermined period of time.

In such a case, when the predetermined condition is satisfied, the number of game values given and the number of game values consumed, which have been stored in the RAM 33, can be deleted. As a result, player's win or lose of the game can be once reset.

[Processing Operation of Slot Machine 1 (1C, 1D): Sub Control Board 72]

When various processes are executed by the second game execution process in the main control board 71, a result or contents corresponding to the process is/are inputted as a command or data to the sub control board 72. The sub control board 72 performs displays of the payout-number display unit 8 and the credit-number display unit 9 and the like of the central liquid crystal panel 5B, and displays an effect image on the upper liquid crystal panel 5A. In addition, the sub control board 72 presents an effect by a sound output from the speaker 23, dependently on or independently from the effect made on the upper liquid crystal panel 5A. In this embodiment, moreover, a second conversation process which will be described below is executed in accordance with a voice input through the microphone 90.

[Second Conversation Process]

A second conversation process will be described with reference to FIG. 22. FIG. 22 is a flowchart showing a second conversation process. The process is implemented by the sub CPU 74 reading out and executing a second conversation processing program which is stored in the program ROM 75.

When the second conversation process is executed, first, the sub CPU 74 determines whether a voice signal has been inputted from the microphone 90 or not (G1). When it is determined that a voice signal has not been inputted (G1: NO), the step G1 is re-executed so that a standby state continues until a voice signal is inputted.

Subsequently, a voice recognition process is executed (G2). In this process, a voice signal is converted into a character string signal, and outputted. Since the voice recognition process is the same as in the first embodiment, a description thereof will be omitted. Then, an answer extraction process is executed (G3). In this process, an answer 136 guessed from the character string signal is extracted. Since the answer extraction process is the same as in the first embodiment, a description thereof will be omitted.

Then, whether the outside-outputting medium which has been set in F18 of the second game execution process described above is the speaker 23 or not is determined (G4). When the outside-outputting medium set is the speaker 23 (G4: YES), the answer 136 extracted in G3 is voice-outputted from the speaker 23 (G5). On the other hand, when the outside-outputting medium set is not the speaker 23 (in a case where the outside-outputting medium has been set to be the central liquid crystal panel 5B in F16) (G4: NO), the answer 136 extracted in G3 is outputted to the central liquid crystal panel 5B in the form of a displayed image (G6) (see FIG. 19). Here, the second conversation process once ends.

In the above-described structure, when the self game value difference is smaller than "0" while the someone's game value difference is equal to or greater than "0", the slot machine 1 (1C, 1D) can switch an output mode of the answer 136 to the central liquid crystal panel 5B. When the self game value difference is equal to or greater than "0" while the someone's game value difference is smaller than "0", the slot machine 1 (1C, 1D) can switch an output mode of the answer 136 to the speaker 23. Therefore, in response to a voice input made by a player, the slot machine 1 (1C, 1D) can output an answer 136 through the speaker 23 or the central liquid crystal panel 5B, which corresponds to increase or decrease of the game value during the game. That is, the slot machine 1 (1C, 1D) can output an answer 136 in an output mode considering win or lose of the neighboring player. This may allow the player to continue the game without being offended.

When the predetermined condition is satisfied, the number of game values given and the number of game values consumed, which have been stored in the RAM 33, can be deleted. As a result, player's win or lose of the game can be once reset.

In the first and second embodiments, the information of the "game value difference" is transmitted and received directly by the neighboring gaming machine. However, this is not limitative. It may be possible that a central management device such as a server gathers a "game value difference" transmitted by each gaming machine and transmits it to each gaming machine.

In the detailed description provided above, characteristic parts have mainly been described in order that the present invention can be understood more easily. However, the present invention is not limited to the embodiment shown in the detailed description provided above, and may be applied to other embodiments. The scope of application of the present invention should be construed as broadly as possible. Terms and phraseologies adopted in the present specification are for correctly illustrating the present invention, not for limiting. It would be easy for those skilled in the art to derive, from the spirit of the invention described in the present specification, other structures, systems, methods and the like which are included in the spirit of the invention. Accordingly, it should be considered that claims cover equivalent structures, too, without departing from the technical idea of the present invention. An object of the abstract is to enable an intellectual property office, general public institutions, persons belonging to the art but not familiar with patent, legal terms, or technical terms to quickly understand technical contents and essences of the present invention through a simple research. Therefore, the abstract is not intended to limit the scope of the invention that should be evaluated by the claims. In addition, it is desirable to sufficiently refer to already-disclosed documents and the like, in order to fully understand the objects and effects of the present invention.

The detailed description provided above includes a process which is executed on a computer or a computer network. The descriptions and expressions provided above are given for the purpose of allowing those skilled in the art to understand the invention most effectively. In the specification, respective steps used to induce one result, or blocks having a predetermined processing function should be understood as a process having no self-contradiction. In addition, in each step or block, an electrical or magnetic signal is transmitted/received, recorded, and the like. In a process in each step or block, such a signal is embodied in the form of a bit, a value, a symbol, a character, a term, a number, and the like. However, it should be noted that they have been used simply because they are convenient for explanations. A process in each step or block has sometimes been described using an expression which is common to a human behavior. However, in principle, the process described in the specification is executed by a variety of devices. In addition, other structures necessary for each step or block are apparent from the above description.

What is claimed is:

1. A gaming machine comprising:
   a conversation device which recognizes a voice of a player and outputs an answer in accordance with the recognized voice;
   an input device which inputs a voice;
   an output device which outputs a voice;
   a volume adjusting device which adjusts volume of voice to be outputted from the output device;
   a game value memory device which stores therein the number of game values given and the number of game values consumed;
   a transmitting device which transmits to outside a difference between the total number of game values given and the total number of game values consumed, as a game value difference;
   a receiving device which receives a game value difference from outside; and
   a controller which is programmed to operate in the steps of:
   (a1) sequentially storing the number of game values consumed per unit game;
   (a2) sequentially storing the number of game values given per unit game;
   (a3) calculating a difference between the total number of game values given and the total number of game values consumed, as a self game value difference;
   (a4) transmitting the self game value difference to outside;
   (a5) receiving someone's game value difference from outside; and
   (a6) when the self game value difference and the someone's game value difference are in a predetermined relationship, voice-outputting, by the conversation device, an answer at volume corresponding to the predetermined relationship from the output device in response to a voice input through the input device.

2. The gaming machine according to claim 1, wherein, under a predetermined condition, the controller deletes the numbers of game values given and consumed which have been stored in the game value memory device.

3. A gaming machine comprising:
   a conversation device which recognizes a voice of a player and outputs an answer in accordance with the recognized voice;
   an input device which inputs a voice;
   an output device which outputs a voice;
   a volume adjusting device which adjusts volume of voice to be outputted from the output device;
   a game value memory device which stores therein the number of game values given and the number of game values consumed;
   a transmitting device which transmits to outside a difference between the total number of game values given and the total number of game values consumed, as a game value difference;
   a receiving device which receives a game value difference from outside; and
   a controller which is programmed to operate in the steps of:
   (b1) sequentially storing the number of game values consumed per unit game;
   (b2) sequentially storing the number of game values given per unit game;
   (b3) calculating a difference between the total number of game values given and the total number of game values consumed, as a self game value difference;
   (b4) transmitting the self game value difference to outside;
   (b5) receiving someone's game value difference from outside;
   (b6) voice-outputting, by the conversation device, an answer at reduced volume from the output device in response to a voice input through the input device, when the self game value difference is smaller than "0" while the someone's game value difference is equal to or greater than "0"; and
   (b7) voice-outputting, by the conversation device, an answer at increased volume from the output device in response to a voice input through the input device, when the self game value difference is equal to or greater than "0" while the someone's game value difference is smaller than "0".

4. The gaming machine according to claim 3, wherein, under a predetermined condition, the controller deletes the numbers of game values given and consumed which have been stored in the game value memory device.

5. A gaming machine comprising:
   a conversation device which recognizes a voice of a player and outputs an answer in accordance with the recognized voice;

an input device which inputs a voice;
a voice output device which outputs a voice;
a display device which displays an answer;
a switching device which switches between the voice output device and the display device;
a game value memory device which stores therein the number of game values given and the number of game values consumed;
a transmitting device which transmits to outside a difference between the total number of game values given and the total number of game values consumed, as a game value difference;
a receiving device which receives a game value difference from outside; and
a controller which is programmed to operate in the steps of:
(c1) sequentially storing the number of game values consumed per unit game;
(c2) sequentially storing the number of game values given per unit game;
(c3) calculating a difference between the total number of game values given and the total number of game values consumed, as a self game value difference;
(c4) transmitting the self game value difference to outside;
(c5) receiving someone's game value difference from outside;
(c6) switching a device for outputting an answer to the voice output device or the display device in accordance with a relationship between the self game value difference and the someone's game value difference; and
(c7) outputting, by the conversation device, an answer through the voice output device or the display device thus switched, in response to a voice input through the input device.

6. The gaming machine according to claim 5, wherein, under a predetermined condition, the controller deletes the numbers of game values given and consumed which have been stored in the game value memory device.

7. A gaming machine comprising:
a conversation device which recognizes a voice of a player and outputs an answer in accordance with the recognized voice;
an input device which inputs a voice;
a voice output device which outputs a voice;
a display device which displays an answer;
a switching device which switches between the voice output device and the display device;
a game value memory device which stores therein the number of game values given and the number of game values consumed;
a transmitting device which transmits to outside a difference between the total number of game values given and the total number of game values consumed, as a game value difference;
a receiving device which receives a game value difference from outside; and
a controller which is programmed to operate in the steps of:
(d1) sequentially storing the number of game values consumed per unit game;
(d2) sequentially storing the number of game values given per unit game;
(d3) calculating a difference between the total number of game values given and the total number of game values consumed, as a self game value difference;
(d4) transmitting the self game value difference to outside;
(d5) receiving someone's game value difference from outside;
(d6) switching, by the conversation device, a device for outputting an answer to the display device, when the self game value difference is smaller than "0" while the someone's game value difference is equal to or greater than "0";
(d7) switching, by the conversation device, a device for outputting an answer to the voice output device, when the self game value difference is equal to or greater than "0" while the someone's game value difference is smaller than "0"; and
(d8) outputting, by the conversation device, an answer through the voice output device or the display device thus switched, in response to a voice input through the input device.

8. The gaming machine according to claim 7, wherein, under a predetermined condition, the controller deletes the numbers of game values given and consumed which have been stored in the game value memory device.

9. A control method of a gaming machine, including the steps of:
sequentially storing the number of game values consumed per unit game;
sequentially storing the number of game values given per unit game;
calculating a difference between the total number of game values given and the total number of game values consumed, as a self game value difference;
transmitting the self game value difference to outside;
receiving someone's game value difference from outside; and
when the self game value difference and the someone's game value difference are in a predetermined relationship, voice-outputting, by a conversation device, an answer at volume corresponding to the predetermined relationship from an output device in response to a voice input through an input device.

* * * * *